US011620592B2

(12) United States Patent
Ramot et al.

(10) Patent No.: US 11,620,592 B2
(45) Date of Patent: Apr. 4, 2023

(54) SYSTEMS AND METHODS FOR PLANNING TRANSPORTATION ROUTES

(71) Applicant: Via Transportation, Inc., New York, NY (US)

(72) Inventors: Daniel Ramot, New York, NY (US); Oren Shoval, Jerusalem (IL); Yaron Rakah, Givatayim (IL); Shmulik Marcovitch, Kfar Saba (IL); Elad Berkman, Givatayim (IL); Dan Marcus, Tel Aviv (IL)

(73) Assignee: VIA TRANSPORTATION, INC., New York, NY (US)

( * ) Notice: Subject to any disclaimer, the term of this patent is extended or adjusted under 35 U.S.C. 154(b) by 394 days.

(21) Appl. No.: 16/379,243

(22) Filed: Apr. 9, 2019

(65) Prior Publication Data

US 2019/0311307 A1 Oct. 10, 2019

Related U.S. Application Data

(60) Provisional application No. 62/654,818, filed on Apr. 9, 2018.

(51) Int. Cl.
*G01C 21/34* (2006.01)
*G06Q 50/30* (2012.01)
(Continued)

(52) U.S. Cl.
CPC ........... *G06Q 10/06* (2013.01); *G01C 21/343* (2013.01); *G01C 21/3438* (2013.01);
(Continued)

(58) Field of Classification Search
CPC .. G06Q 10/06; G06Q 10/047; G06Q 30/0205; G06Q 50/30; G01C 21/343; G01C 21/3438; G08G 1/20
See application file for complete search history.

(56) References Cited

U.S. PATENT DOCUMENTS 4,212,069 A   7/1980  Baumann
4,502,123 A   2/1985  Minami et al.
(Continued)

FOREIGN PATENT DOCUMENTS

CN   103198647      7/2013
CN   103279669 A    9/2013
(Continued)

OTHER PUBLICATIONS

Search Report and Written Opinion dated Jun. 6, 2019 in the counterpart International Application No. PCT/US2019/026510, 12 pages.

(Continued)

*Primary Examiner* — Ig T An
(74) *Attorney, Agent, or Firm* — Pearl Cohen Zedek Latzer Baratz LLP

(57) ABSTRACT

The present disclosure relates to systems and methods for planning transportation routes. In one implementation, a method for simulating vehicle ridesharing is provided. The method may include receiving a first input of a geographical area and accessing map information of roadways in the geographical area. The method may also include receiving a second input indicative of at least one scenario of ridesharing demand in the geographical area and receiving a third input indicative of virtual vehicles designated to transport virtual passengers associated with the scenario. The method may further include initiating a transportation simulation of scenario to simulate rides of the virtual vehicles transporting the virtual passengers along the roadways. The method may also include determining, based on the transportation simulation, a performance level associated with the virtual vehicles and providing an output representative of the determined performance level.

25 Claims, 15 Drawing Sheets

(51) Int. Cl.
  *G06Q 30/02* (2012.01)
  *G08G 1/00* (2006.01)
  *G06Q 10/06* (2012.01)
  *G06Q 10/04* (2012.01)
  *G06Q 10/047* (2023.01)
  *G06Q 30/0204* (2023.01)

(52) U.S. Cl.
  CPC ....... *G06Q 10/047* (2013.01); *G06Q 30/0205* (2013.01); *G06Q 50/30* (2013.01); *G08G 1/20* (2013.01)

(56) References Cited

U.S. PATENT DOCUMENTS

| | | |
|---|---|---|
| 4,528,679 A | 7/1985 | Shahbaz |
| 5,897,629 A | 4/1999 | Shinagawa |
| 6,459,986 B1 | 10/2002 | Boyce |
| 7,136,747 B2 | 11/2006 | Raney |
| 7,146,270 B2 | 12/2006 | Nozaki |
| 8,082,095 B2 | 12/2011 | Sumcad et al. |
| 8,520,695 B1 | 8/2013 | Rubin |
| 8,688,532 B2 | 4/2014 | Khunger et al. |
| 8,799,038 B2 | 8/2014 | Chen |
| 8,868,529 B2 | 10/2014 | Lerenc |
| 9,068,851 B2 | 6/2015 | Lerenc |
| 9,074,904 B1 | 7/2015 | Huang et al. |
| 9,094,824 B2 | 7/2015 | Jayanthi |
| 9,293,048 B2 | 3/2016 | Fowler |
| 9,304,009 B2 | 4/2016 | Beaurepaire et al. |
| 9,322,661 B2 | 4/2016 | Wechsler |
| 9,494,439 B1 | 11/2016 | Ross et al. |
| 9,562,785 B1 | 2/2017 | Racah et al. |
| 9,599,481 B2 | 3/2017 | Lord et al. |
| 9,679,489 B2 | 6/2017 | Lambert |
| 9,689,694 B2 | 6/2017 | Lord |
| 9,706,367 B2 | 7/2017 | Tao |
| 9,720,415 B2 | 8/2017 | Levinson |
| 9,816,824 B1 | 11/2017 | Racah et al. |
| 9,903,721 B2 | 2/2018 | Choi |
| 9,939,279 B2 | 4/2018 | Pan |
| 10,156,848 B1 | 12/2018 | Konrardy et al. |
| 10,648,822 B2 | 5/2020 | Newlin |
| 10,762,447 B2 | 9/2020 | Kislovskiy |
| 2001/0037174 A1 | 11/2001 | Dickerson |
| 2002/0011940 A1 | 1/2002 | Cappel |
| 2003/0177020 A1 | 9/2003 | Okamura |
| 2004/0076280 A1 | 4/2004 | Ando |
| 2004/0088392 A1 | 5/2004 | Barrett |
| 2004/0093280 A1 | 5/2004 | Yamaguchi |
| 2004/0158483 A1 | 8/2004 | Lecouturier |
| 2004/0215382 A1 | 10/2004 | Breed |
| 2005/0021227 A1 | 1/2005 | Matsumoto |
| 2006/0059023 A1 | 3/2006 | Mashinsky |
| 2006/0106655 A1 | 5/2006 | Lettovsky et al. |
| 2006/0178949 A1 | 8/2006 | McGrath |
| 2006/0208169 A1 | 9/2006 | Breed |
| 2006/0276960 A1 | 12/2006 | Adamczyk |
| 2007/0164726 A1 | 7/2007 | de Marcken et al. |
| 2007/0168239 A1 | 7/2007 | Marcken et al. |
| 2007/0248220 A1 | 10/2007 | Crandell |
| 2008/0015923 A1 | 1/2008 | Masaba |
| 2008/0027772 A1 | 1/2008 | Gernega et al. |
| 2008/0152036 A1 | 7/2008 | Breed |
| 2008/0189207 A1 | 8/2008 | Wurster |
| 2008/0195428 A1 | 8/2008 | O'Sullivan |
| 2008/0270204 A1 | 10/2008 | Poykko |
| 2008/0277183 A1 | 11/2008 | Huang et al. |
| 2009/0005963 A1 | 1/2009 | Jarvinen |
| 2009/0049044 A1 | 2/2009 | Mitchell |
| 2009/0083111 A1 | 3/2009 | Carr |
| 2009/0177502 A1 | 7/2009 | Doinoff |
| 2009/0192851 A1 | 7/2009 | Bishop |
| 2009/0210276 A1 | 8/2009 | Krumm et al. |
| 2009/0216600 A1 | 8/2009 | Hill |
| 2009/0248587 A1 | 10/2009 | Van Buskirk |
| 2009/0271227 A1 | 10/2009 | Hayat |
| 2009/0327011 A1 | 12/2009 | Petroff |
| 2010/0030594 A1 | 2/2010 | Swart |
| 2010/0052945 A1 | 3/2010 | Breed |
| 2010/0280884 A1 | 11/2010 | Levine |
| 2010/0299177 A1 | 11/2010 | Buczkowski et al. |
| 2011/0099040 A1 | 4/2011 | Felt |
| 2011/0130916 A1 | 6/2011 | Mayer |
| 2011/0153629 A1 | 6/2011 | Lehmann |
| 2011/0191017 A1 | 8/2011 | Certain |
| 2011/0195699 A1 | 8/2011 | Tadayon |
| 2011/0213629 A1 | 9/2011 | Clark |
| 2011/0238457 A1 | 9/2011 | Mason |
| 2011/0301985 A1 | 12/2011 | Camp et al. |
| 2012/0010912 A1 | 1/2012 | Lele |
| 2012/0041675 A1 | 2/2012 | Juliver |
| 2012/0078672 A1 | 3/2012 | Mohebbi et al. |
| 2012/0109721 A1 | 5/2012 | Cebon |
| 2012/0232943 A1 | 9/2012 | Myr |
| 2012/0239452 A1 | 9/2012 | Trivedi |
| 2012/0290652 A1 | 11/2012 | Boskovic |
| 2013/0006464 A1 | 1/2013 | Speiser |
| 2013/0046586 A1 | 2/2013 | Lerner et al. |
| 2013/0054281 A1 | 2/2013 | Thakkar et al. |
| 2013/0060468 A1 | 3/2013 | Delling |
| 2013/0060586 A1* | 3/2013 | Chen ................ G08G 1/202 705/5 |
| 2013/0073327 A1 | 3/2013 | Edelberg |
| 2013/0096827 A1 | 4/2013 | McCall et al. |
| 2013/0102333 A1 | 4/2013 | Dam |
| 2013/0110385 A1 | 5/2013 | Heed et al. |
| 2013/0132140 A1 | 5/2013 | Amin |
| 2013/0132369 A1 | 5/2013 | Delling et al. |
| 2013/0159028 A1 | 6/2013 | Lerenc et al. |
| 2013/0179205 A1 | 7/2013 | Slinin |
| 2013/0218455 A1 | 8/2013 | Clark |
| 2013/0231965 A1 | 9/2013 | Tokatly |
| 2013/0238167 A1 | 9/2013 | Stanfield et al. |
| 2014/0011522 A1 | 1/2014 | Lin et al. |
| 2014/0052481 A1 | 2/2014 | Monteil |
| 2014/0074757 A1 | 3/2014 | De Gennaro et al. |
| 2014/0082069 A1 | 3/2014 | Varoglu |
| 2014/0129302 A1 | 5/2014 | Amin |
| 2014/0129951 A1 | 5/2014 | Amin |
| 2014/0172727 A1 | 6/2014 | Abhyanker |
| 2014/0173511 A1 | 6/2014 | Lehmann et al. |
| 2014/0180773 A1 | 6/2014 | Zafiroglu et al. |
| 2014/0188775 A1 | 7/2014 | Lehmann |
| 2014/0214322 A1 | 7/2014 | Tsimhoni |
| 2014/0229255 A1 | 8/2014 | Scofield |
| 2014/0323167 A1 | 10/2014 | Spearritt |
| 2014/0324505 A1 | 10/2014 | Lerenc et al. |
| 2014/0365250 A1 | 12/2014 | Ikeda |
| 2015/0006072 A1 | 1/2015 | Goldberg |
| 2015/0095122 A1 | 4/2015 | Eramian |
| 2015/0100238 A1 | 4/2015 | Cai et al. |
| 2015/0112585 A1 | 4/2015 | Knepper |
| 2015/0161554 A1 | 6/2015 | Sweeney et al. |
| 2015/0161564 A1 | 6/2015 | Sweeney |
| 2015/0204684 A1 | 7/2015 | Rostamian et al. |
| 2015/0206437 A1 | 7/2015 | Fowler |
| 2015/0219464 A1 | 8/2015 | Beaurepaire et al. |
| 2015/0242944 A1 | 8/2015 | Willard |
| 2015/0248689 A1 | 9/2015 | Paul |
| 2015/0294430 A1 | 10/2015 | Huang |
| 2015/0310378 A1 | 10/2015 | van der Berg |
| 2015/0310379 A1 | 10/2015 | Farrelly et al. |
| 2015/0324718 A1 | 11/2015 | Lord |
| 2015/0324945 A1 | 11/2015 | Lord et al. |
| 2015/0345951 A1 | 12/2015 | Dutta et al. |
| 2016/0021154 A1 | 1/2016 | Schoeffler |
| 2016/0027306 A1 | 1/2016 | Lambert |
| 2016/0027307 A1 | 1/2016 | Abhyanker |
| 2016/0034845 A1 | 2/2016 | Hiyama |
| 2016/0171574 A1 | 6/2016 | Paulucci |
| 2016/0209220 A1 | 7/2016 | Laetz |
| 2016/0210675 A1 | 7/2016 | Smart |
| 2016/0231128 A1 | 8/2016 | Marks |
| 2016/0253599 A1 | 9/2016 | Lang |

(56) References Cited

U.S. PATENT DOCUMENTS

| | | | |
|---|---|---|---|
| 2016/0320194 A1 | 11/2016 | Liu et al. | |
| 2016/0321771 A1 | 11/2016 | Liu et al. | |
| 2016/0335576 A1 | 11/2016 | Peng | |
| 2016/0356615 A1 | 12/2016 | Arata | |
| 2016/0361970 A1 | 12/2016 | Pebbles | |
| 2016/0364678 A1 | 12/2016 | Cao | |
| 2016/0364679 A1 | 12/2016 | Cao | |
| 2016/0364812 A1 | 12/2016 | Cao | |
| 2016/0364823 A1* | 12/2016 | Cao | G01C 21/3438 |
| 2017/0059334 A1 | 3/2017 | Mukherjee | |
| 2017/0138749 A1 | 5/2017 | Pan | |
| 2017/0167882 A1 | 6/2017 | Ulloa Paredes et al. | |
| 2017/0169366 A1 | 6/2017 | Klein | |
| 2017/0185948 A1 | 6/2017 | Magazinik | |
| 2017/0153714 A1 | 8/2017 | Gao et al. | |
| 2017/0243492 A1 | 8/2017 | Lambert et al. | |
| 2017/0248963 A1 | 8/2017 | Levinson et al. | |
| 2017/0284819 A1 | 10/2017 | Donnelly | |
| 2017/0300053 A1 | 10/2017 | Wengreen et al. | |
| 2017/0301054 A1 | 10/2017 | Sangoi et al. | |
| 2017/0313208 A1 | 11/2017 | Lindsay | |
| 2017/0365030 A1 | 12/2017 | Shoham et al. | |
| 2018/0046944 A1 | 2/2018 | Barbera | |
| 2018/0073882 A1 | 3/2018 | North | |
| 2018/0080263 A1 | 3/2018 | Rose | |
| 2018/0087915 A1 | 3/2018 | Marco | |
| 2018/0091604 A1 | 3/2018 | Yamashita | |
| 2018/0121847 A1 | 5/2018 | Zhao | |
| 2018/0189682 A1 | 7/2018 | Seacat | |
| 2018/0191863 A1 | 7/2018 | Matthieson et al. | |
| 2018/0197418 A1* | 7/2018 | Chu | G06Q 10/04 |
| 2018/0211228 A1* | 7/2018 | Narayan | H04L 51/52 |
| 2018/0224866 A1 | 8/2018 | Alonso-mora | |
| 2018/0231984 A1 | 8/2018 | Alonso-mora | |
| 2018/0260787 A1 | 9/2018 | Xi | |
| 2018/0290610 A1 | 10/2018 | Zych | |
| 2018/0338225 A1 | 11/2018 | Shimizu | |
| 2018/0340790 A1 | 11/2018 | Kislovskiy et al. | |
| 2018/0342035 A1 | 11/2018 | Sweeney | |
| 2018/0348772 A1 | 12/2018 | Stefan | |
| 2018/0356239 A1 | 12/2018 | Marco | |
| 2019/0086221 A1 | 3/2019 | Thiyagarajan | |
| 2019/0114638 A1 | 4/2019 | Flores | |
| 2019/0122561 A1 | 4/2019 | Shimizu | |
| 2019/0171943 A1 | 6/2019 | Pao et al. | |
| 2019/0205842 A1 | 7/2019 | Starns | |
| 2019/0206258 A1 | 7/2019 | Chang et al. | |
| 2019/0259182 A1 | 8/2019 | Sarukkai et al. | |
| 2019/0271552 A1 | 9/2019 | Choi et al. | |
| 2019/0311307 A1 | 10/2019 | Ramot | |
| 2020/0104965 A1 | 4/2020 | Ramot | |
| 2020/0160476 A1 | 5/2020 | Ramot | |
| 2020/0160477 A1 | 5/2020 | Ramot | |
| 2020/0160478 A1 | 5/2020 | Ramot | |
| 2020/0160705 A1 | 5/2020 | Chase | |
| 2020/0160709 A1 | 5/2020 | Ramot | |
| 2020/0333146 A1 | 10/2020 | Shoval | |
| 2020/0334987 A1 | 10/2020 | Shoval | |
| 2020/0361406 A1 | 11/2020 | Zych | |
| 2021/0073825 A1 | 3/2021 | Walling | |

FOREIGN PATENT DOCUMENTS

| | | |
|---|---|---|
| CN | 103327440 | 9/2013 |
| CN | 104751625 | 7/2015 |
| EP | 2605149 | 6/2013 |
| EP | 2665050 A1 | 11/2013 |
| EP | 2792538 | 10/2014 |
| EP | 3472563 | 4/2019 |
| EP | 3574459 | 12/2019 |
| EP | 3631707 | 4/2020 |
| EP | 3659078 | 6/2020 |
| EP | 3738085 | 11/2020 |
| EP | 3776395 | 2/2021 |
| GB | 2 397 683 | 7/2004 |
| JP | 2003006294 | 1/2003 |
| JP | 2003233656 | 8/2003 |
| JP | 2003271706 | 9/2003 |
| JP | 2003281422 | 10/2003 |
| JP | 2004062490 | 2/2004 |
| JP | 2004192366 | 7/2004 |
| JP | 2004362271 | 12/2004 |
| JP | 2010231258 | 10/2010 |
| JP | 2011214930 | 10/2011 |
| JP | 2019525299 | 9/2019 |
| JP | 2020522789 | 7/2020 |
| KR | 20090044693 | 5/2009 |
| KR | 20100053717 | 5/2010 |
| KR | 101752159 | 6/2017 |
| SG | 2012065264 | 4/2014 |
| WO | WO2006128946 | 12/2006 |
| WO | WO 2012/143300 | 10/2012 |
| WO | WO2012143300 | 10/2012 |
| WO | WO2014106617 | 7/2014 |
| WO | WO2016209595 | 12/2016 |
| WO | WO2017223031 | 12/2017 |
| WO | WO2018140505 | 8/2018 |
| WO | WO2018217640 | 11/2018 |
| WO | WO2019023324 | 1/2019 |
| WO | WO2019136341 | 7/2019 |
| WO | WO2019199766 | 10/2019 |

OTHER PUBLICATIONS

Ma, Shuo et al. T-Share: A large scale dynamic taxi ridesharing service, 2013, IEEE, Proceedings of the 29th International Conference on Data Engineering (ICDCO, 2016, pp. 410-421 (year 2013).

Wen He; Kai Hwang; Deyi Li, Intelligent carpool routing for urban ridesharing by mining GPS trajectories, IEEE Transactions on intelligent transportation systems; year 2014, vol. 15, issue 5, pp. 2286-2296; DOI 10.1109/TITS.2014.2315521.

Dejan Dimitrijevic, Nernanja Nedjc, Vladimir Dimitrieski, Real-time carpooling and ride-sharing: Position paper design concepts, distribution and cloud computing strategies; Computer Science and Information Systems (FedCSIS) 2013 Federated Conference on year 2013, pp. 781-786; Referenced in IEEE Conference Publications.

Harini Sirisena, Ride Buddies—Multi agent system for ride sharing/carpooling; Advances in ICT for Emerging Regions (ICTer) 2014 International Conference year 2014; pp. 252-252, DOI:10.1109/ICTER.2014.7083910: Referenced IEEE Conference Publications.

Chung-Min Chen, David Shallcross, Yunng-Chien Shih. Yen-Ching Wu, Sheng-Po Kou, Yuan-Ying Hsi, Yuhsiang Holderby, William Chou, Smart ride share with flexible route matching: Chung-Min Chen, David Shallcross, Advanced Communication Technology (ICACT) 2011, 13th International Conference, pp. 1506-1510.

Nianbo Liu; Ming Liu; Jiannong Cao; Guihai Chen; Wei Lou, When transportation meets communication: V2P over VANETs; Distributed Computing Systems (ICDCS) 2010 IEEE 30th International Conference year 2010, pp. 567-576, DOI:10.1109/ICDCS.2010.83.

Li et al., A dynamic pricing method for carpooling service based on coalition at game analysis; 2016 IEEE 18th Intern Conf on High Performance Computing and Comm; IEEE 14th Intern Conf on Smart City IEEE 2nd Intern Conf on Data Science and Systems (hpcc/SmartCity/dss 9HPCC/Smartcity/DSS) year 2016 pp. 78-85; DOI:10.1109/HPCC-SmartCity-DSS) year 2016, pp. 78-85, DOI:10.1109/HPCC-SmartCity-DSS.2016.0022.

Lasse Korsholm Poulsen, Daan Dekkers, Nicolaas Wagenaar; Wesley Snijders; Ben Lewinsky; Raghava Rao Mukkamala; Ravi Valrapu; Green cabs vs. Uber in New York City, 2016 IEEE international Congress on Big Data (BigDataCongress) Year 2016:pp. 222-229, DOI: 10.1109/BigDataCongress.2016.35.

Hawkins, Andrew, Uberhop is Uber's Latest idea for killing mass transit, Dec. 8, 2015, The Verge, p. 1-4.

Alonso-Mora, Javier et al. "On-Demand High-Capacity Ride-Sharing via Dynamic Trip-Vehicle Assignment." Proceedings of the National Academy of Sciences 114, 3 (Jan. 2017): 462-467 © 2017 National Academy of Sciences.

(56) References Cited

OTHER PUBLICATIONS

Mora, Supplemental Material—On Demand high-capacity ride-sharing via dynamic trip—vehicle assignment, Jul. 20, 2016, p. 1-36.
Whitney, Alyse, I took Via to work every day for a month. Here's what I learned, May 10, 2016, p. 1-3.
Y. Hou, W. Zhong, L. Su, K. Hulme, A. W. Sadek and Qiao, "TASeT: Improving the Efficiency of Electric Taxis With Transfer-Allows Rideshare", in IEEE Transactions on Vehicular Technology, vol. 56., No. 12, pp. 9518-9528, Dec. 2016, doi:10.1109//TVT.2016.2592983. (Year 2016).
Agatz, Niels, et al. "Optimization for dynamic ride-sharing: A review." European Journal of Operational Research 223.2 (2012): 295-303 (year:2012).
Office Action for European Appl. No. 18731617.9 dated Jan. 25, 2022.
Office Action for U.S. Appl. No. 16/752,381 dated Apr. 14, 2022.
Office Action for European Appl. No. 19702319.5 dated Jan. 25, 2022.
Office Action for European Appl. No. 18758779.5 dated Nov. 8, 2021.
Office Action for European Appl. No. 19702319.5 dated Oct. 26, 2021.
Office Action for European Appl. No. 18703675.1 dated Oct. 8, 2021.
Office Action for Japanese Appl. No. 2019-564501 dated Jan. 27, 2021.
Office Action for U.S. Appl. No. 16/752,281 dated Apr. 14, 2022.
Office Action for U.S. Appl. No. 16/921,257 dated Mar. 31, 2022.
Notice of Allowance for U.S. Appl. No. 16/750,679 dated May 3, 2021.
Office Action for U.S. Appl. No. 15/916,373 dated Dec. 16, 2020.
Office Action for U.S. Appl. No. 16/751,321 dated May 17, 2022.
Office Action for U.S. Appl. No. 15/629,919 dated Mar. 15, 2022.
Office Action for U.S. Appl. No. 16/920,012 dated Jun. 6, 2022.
Paz Linares M. et al. A simulation framework for real-time assessment of dynamic ride sharing demand responsive transportation models, Dec. 11, 2016; Dec. 11, 2016-Dec. 14, 2016, Dec. 11, 2016, pp. 2216-2227, XP058310070, DOI:10.1109/WSC.2016.7822263 ISBN: 987-1-5090-4484-9.
European Office Action for EP Appl. No. 19720015.7 dated Jun. 21, 2022.
Ridesharing in North America: Past, Present, and Future, Nelson D. Chan and Susan Shaheen, published in Transport Reviews, vol. 32, No. 1, 93-112, Jan. 2012.
Los Angeles Smart Traveler Field Operational Test Evaluation, Genevieve Giuliano, Randolph W. Hall, and Jacqueline M. Golob, University of Southern California, California PATH Research Report UCB-ITS-PRR-95-41, Dec. 1995.
Seattle Smart Traveler, Daniel J. Dailey, Donald Loseff, David Meyers, Final Research Report, Washington State Transportation Center (TRAC), Oct. 1997, 1-32.
Dynamic Taxi-sharing Service Using Intelligent Transportation System Technologies, Chi-Chung Tao, IEEE, 3209-3212, 2007.
A Survey of Mobile Phone Sensing, Nicholas D. Lane, Emiliano Miluzzo, Hong Lu, Daniel Peebles, Tanzeem Choudhury, and Andrew T. Campbell, IEEE Communications Magazine, 140-150, Sep. 2010.
The Research and Implementation of GPS Intelligent Transmission Strategy Based on on-board Android Smartphones, Zhiqiang Wei, Yaqing Song, Hao Liu, Yanxiu Sheng, and Xi Wang, IEEE, 1230-1233, 2013.
Smarter transportation case study #10: Dynamic Ridesharing in Cork., Transportation for America, https://web.archive.org/web/20111007214904/http://t4america.org/blog/2...ter-transportation-case-study-10-dynamic-ridesharing in-cork-ireland/, Crawled 2011, Retrieved Nov. 15, 2021.
Avego Real-Time Ridesharing, Avego Ltd., https://web.archive.org/web/20111021225957/http://www.avego.com:80/st/realtime.php , Crawled 2011, Retrieved Nov. 15, 2021.
Avego Introduction, Avego Ltd., https://web.archive.org/web/20111102165609/http://www.avego.com:80/st/index.php, Crawled 2011, Retrieved Nov. 15, 2021.
Understanding the NAVSTAR GPS, GIS, and IVHS 2nd Edition, Tom Logsdon, Van Nostrand Reinhold, 1995.
Behind the Success of the CVCC Engine, Honda Worldwide, https://web.archive.org/web/20070219081359/http://world.honda.com/history/challenge/1981navigationsystem/text/01.html, Crawled 2007, Retrieved Dec. 13, 2021.
The Final Test: From Suzuka to Tokyo, Honda Worldwide, https://web.archive.org/web/20070221131328/http://world.honda.com/history/challenge/1981navigationsystem/text/06.html, Crawled 2007, Retrieved Dec. 13, 2021.
Creating a Progressive Strategy, Honda Worldwide, https://web.archive.org/web/20070221131445/http://world.honda.com/history/challenge/1981navigationsystem/text/02.html, Crawled 2007, Retrieved Dec. 13, 2021.
Map Navigation Software of the Electro-Multivision of the '91 Toyota Soarer, Kunihiro Ishikawa, Michima Ogawa, Shiegtoshi Azuma, and Tooru Ito, IEEE Vehicle Navigation and Information Systems Conference, 463-473, 1991.
Agatz, Niels, et al. "Sustainable passenger transportation: Dynamic ride-sharing." (2010) (Year: 2010).
Automobile Navigation: Where is it Going?, Robert L. French, IEEE Aerospace and Electronic Systems Magazine, vol. 2, Issue: 5, 6-12, May 1987.
TravTek Global Evaluation and Executive Summary, V.W. Imnan and J.I. Peters, U.S. Department of Transportation Federal Highway Administration, Pub. No. FHWA-RD-96-031, Mar. 1996.
TravTek System Architecture Evaluation, C. Blumentritt, K. Balke, E. Symour, and R. Sanchez, U.S. Department of Transportation Federal Highway Administration, Pub. No. FHWARD-94-141, Jul. 1995.
Historical overview of automobile navigation technology, Robert L. French, 36th IEEE Vehicular Technology Conference, 1986.
The Dynamic Traffic Information Collection and Processing Methods of ITS Common Information Platform Based on Floating Car Technology, Haowei Su and Wei Zhang, IEEE 2008 International Seminar on Future BioMedical Information Engineering, 156-159, 2008.
Furuhata, et al., Ridesharing: The state-of-the-art and future directions, Transportation Research Part B 57 (2013) 28-46.

* cited by examiner

QoS Report

Top Sheet Results:

| Metric | Statistic | Filters | tlv_scenario_1_vans_5_cap_0_4_flex_10800sec |
|---|---|---|---|
| Requests | count | unique (1st in session) + valid | 55 |
| Completed rides | % | unique (last in session) + valid | 74.545 |
| Proposal ETA [min] | mean | completed rides | 9.022 |
| Pickup Walk [m] | mean | completed rides | 151.22 |
| Dropoff Walk [m] | mean | completed rides | 187.512 |

FIG. 9

SYSTEMS AND METHODS FOR PLANNING TRANSPORTATION ROUTES

CROSS REFERENCE TO RELATED APPLICATION

This application claims the benefit of priority of U.S. Provisional Patent Application No. 62/654,818, filed Apr. 9, 2018, which is incorporated herein by reference in its entirety.

BACKGROUND

I. Technical Field

The present disclosure generally relates to the field of vehicle ridesharing and systems and methods for planning transportation routes.

II. Background Information

Recent years have witnessed increasing interest and development in the field of vehicle sharing, where one or more riders may share the same vehicle for a portion of their rides. Ridesharing may save ride costs, increase vehicle utilization, and reduce air pollution. A rider may use a ridesharing service through a ridesharing service application accessed by the rider's mobile device.

SUMMARY

Embodiments consistent with the present disclosure provide systems and methods for vehicle ridesharing and for managing a fleet of ridesharing vehicles. For example, consistent with the disclosed embodiments, the fleet of ridesharing vehicles may include more than 10 ridesharing vehicles, more than 100 ridesharing vehicles, or more than 1000 ridesharing vehicles that pick up multiple users and drop them off at locations proximate but other than their desired destinations.

In one embodiment, a non-transitory computer-readable medium may store instructions for simulating vehicle ridesharing. The instructions may be executable by at least one processor to cause the at least one processor to perform a method including receiving a first input of a geographical area and accessing map information of roadways in the geographical area. The method may also include receiving a second input indicative of at least one scenario of ridesharing demand in the geographical area and receiving a third input indicative of a plurality of virtual vehicles designated to transport virtual passengers associated with the at least one scenario of ridesharing demand in the geographical area. The method may further include initiating a transportation simulation of the at least one scenario of ridesharing demand in the geographic area to simulate rides of the plurality of virtual vehicles transporting the virtual passengers along the roadways. The method may also include determining, based on the transportation simulation, a performance level associated with the plurality of virtual vehicles and providing an output representative of the determined performance level associated with the plurality of virtual vehicles.

In one embodiment, a non-transitory computer-readable medium may store instructions for simulating vehicle ridesharing. The instructions may be executable by at least one processor to cause the at least one processor to perform a method including receiving a first input of a geographical area and accessing map information of roadways in the geographical area. The method may also include receiving a second input indicative of real-time ridesharing demand from a plurality of users in the geographical area and receiving a third input indicative of values for a plurality of service parameters. The method may further include identifying at least one user that the plurality of ridesharing vehicles cannot pick-up under the values for the plurality of service parameters. The method may also include initiating at least one transportation simulation based on the real time ridesharing demand using different values for the plurality of service parameters and provide a recommendation based on one or more results of the at least one transportation simulation.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute part of this disclosure, illustrate various example embodiments. In the drawings:

FIG. 9 is a table illustrating an example performance evaluation report, in accordance with some embodiments of the present disclosure.

DETAILED DESCRIPTION

Figure 1:
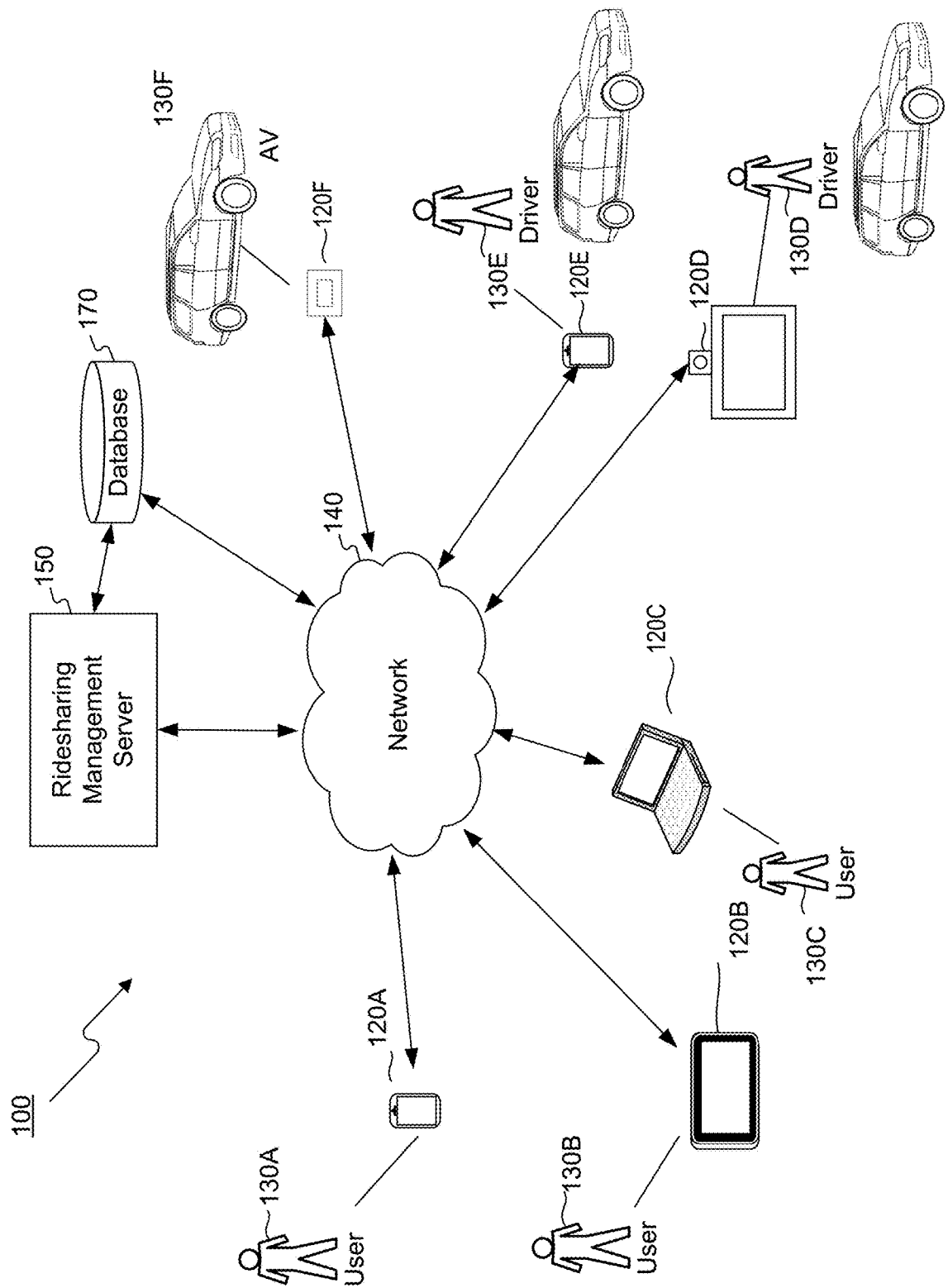
FIG. 1 is a diagram illustrating an example ridesharing management system, in accordance with some embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Disclosed embodiments of the present disclosure provide methods and systems for vehicle ridesharing and vehicle ridesharing management. The term "vehicle" or "ridesharing vehicle" as used herein refers to any kind of vehicle (e.g., car, van, SUV, truck, bus, etc.) suitable for human transportation, such as providing ride services. In some embodiments, a vehicle may be a taxi. In some embodiments, a vehicle may include an autonomous vehicle, wherein a control device integrated with the vehicle or a management system separate from the vehicle may send operational instructions and guide the vehicle to designated pick-up locations and drop-off locations. For the ease and conciseness of description, some embodiments disclosed herein may simply refer to a vehicle or a taxi as an example, which does not limit the scope of the disclosed embodiments.

Consistent with some embodiments of the present disclosure, a ridesharing management system may receive a first ride request from a first user. The first ride request may include a starting point and a desired destination. The ridesharing management system may calculate a first estimated pick-up time based on a current location of a vehicle that is in the surrounding areas. After sending a confirmation with the estimated pick-up time, the ridesharing management system may then guide the vehicle to a pick-up location for picking up the first rider. The pick-up location may be a different location from the starting point included in the first ride request. The system may also guide the first user to the pick-up location.

In some embodiments, the system may subsequently receive a second ride request from a second user, for example, while the first user is still in the vehicle. The second ride request may include a second starting point and a second desired destination. The system may calculate a second estimated pick-up time, provide a second confirmation to the second rider, and guide the second rider to a second pick-up location. In some embodiments, the second pick-up location may be a different location from the second starting point included in the second ride request.

In some embodiments, the system may calculate the fares for each user, based on the solo ride portion for a corresponding user, and the shared portion of the ride. For example, the system may offer a discount for the shared portion of the ride. In some embodiments, the system may also calculate the fare amount for a particular user based on various service-related parameters such as user input regarding whether to use toll roads, the walking distance between the starting point and the pick-up location, and the walking distance between the desired destination and the drop-off location.

The embodiments herein further include computer-implemented methods, tangible non-transitory computer-readable mediums, and systems. The computer-implemented methods can be executed, for example, by at least one processor that receives instructions from a non-transitory computer-readable storage medium. Similarly, systems and devices consistent with the present disclosure can include at least one processor and memory, and the memory can be a non-transitory computer-readable storage medium. As used herein, a "non-transitory computer-readable storage medium" refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," can additionally refer to multiple structures, such a plurality of memories or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be used in implementing a computer-implemented method. The term "computer-readable storage medium" should be understood to include tangible items and exclude carrier waves and transient signals.

FIG. 1 is a diagram illustrating an example ridesharing management system, in which various implementations as described herein may be practiced, according to some embodiments of the present disclosure. As shown in FIG. 1, ridesharing management system 100 may include one or more mobile communications devices 120A-120F (collectively referred to as mobile communications devices 120), a network 140, a ridesharing management server 150, and a database 170. The plurality of mobile communications devices 120A-120F may further include a plurality of user devices 120A-120C associated with users 130A-130C respectively, a plurality of driver devices 120D and 120E associated with drivers 130D and 130E, and a driving-control device 120F associated with an autonomous vehicle 130F. Consistent with some embodiments of the present disclosure, ridesharing management server 150 may communicate with driving-control device 120F to direct autonomous vehicle 130F to pick up and drop off users 130A-130C. In one example, autonomous vehicles capable of detecting objects on the road and navigate to designated locations may be utilized for providing ridesharing services.

The components and arrangements shown in FIG. 1 are not intended to limit the disclosed embodiments, as the system components used to implement the disclosed processes and features can vary. For example, ridesharing management system 100 may include multiple ridesharing management servers 150, and each ridesharing management server 150 may handle a certain category of ridesharing services, ridesharing services associated with a certain category of service vehicles, or ridesharing services in a specific geographical region, such that a plurality of ridesharing management servers 150 may collectively provide a dynamic and integrated ridesharing service system.

Network 140 may facilitate communications between user devices 120 and ridesharing management server 150, for example, receiving ride requests and other ride server related input from or sending confirmations to user devices, and sending ride service assignments to driver devices and driving-control devices. Network 140 may be any type of networks that provides communications, exchanges information, and/or facilitates the exchange of information between ridesharing management server 150 and user devices 120. For example, network 140 may be the Internet, a Local Area Network, a cellular network, a public switched telephone network ("PSTN"), or other suitable connection(s) that enables ridesharing management system 100 to send and receive information between the components of ridesharing management system 100. Network 140 may support a variety of messaging formats and may further support a variety of services and applications for user devices 120. For example, network 140 may support navigation services for mobile communications devices 120, such as directing the users and service vehicles to pick-up or drop-off locations.

Ridesharing management server 150 may be a system associated with a communication service provider which provides a variety of data or services, such as voice, messaging, real-time audio/video, to users, such as users 130A-130E. Ridesharing management server 150 may be a computer-based system including computer system components, desktop computers, workstations, tablets, handheld mobile communications devices, memory devices, and/or internal network(s) connecting the components. Ridesharing management server 150 may be configured to receive information from mobile communications devices 120 over network 140, process the information, store the information, and/or transmit information to mobile communications devices 120 over network 140.

For example, in some embodiments, ridesharing management server 150 may be configured to: receive ride requests from user devices 120A-120C, send ride confirmation and ride fare information to user devices 120A-120C, and send ride service assignments (for example, including pick-up and drop-off location information) to driver devices 120D and 120E, and driving-control device 120F. Further, ridesharing management server 150 may further be configured to receive user input from user devices 120A-120C as to various ride service parameters, such as walking distance to a pick-up location, maximum delay of arrival/detour, and maximum number of subsequent pick-ups, etc. In some embodiments, ridesharing management server 150 may be further configured to: calculate ride fares based on a solo portion of a user's ride and a shared portion of the ride. Further, the ride fare calculation may further be based on various ride service parameters set by the user, such as the walking distance involved in the ride, and user selection regarding toll road usage, etc.

Database 170 may include one or more physical or virtual storages coupled with ridesharing management server 150. Database 170 may be configured to store user account information (including registered user accounts and driver accounts), corresponding user profiles such as contact information, profile photos, and associated mobile communications device information. With respect to users, user account information may further include ride history, service feedbacks, complaints, or comments. With respect to drivers, user account information may further include number of ride service assignments completed, ratings, and ride service history information. Database 170 may further be configured to store various ride requests received from user devices 120A-120C and corresponding starting point and desired destination information, user input regarding various service parameters, pick-up and drop-off locations, time of pick-up and drop-off, ride fares, and user feedbacks, etc.

Database 170 may further include traffic data, maps, and toll road information, which may be used for ridesharing service management. Traffic data may include historical traffic data and real-time traffic data regarding a certain geographical region, and may be used to, for example, calculate estimate pick-up and drop-off times, and determine an optimal route for a particular ride. Real-time traffic data may be received from a real-time traffic monitoring system, which may be integrated in or independent from ridesharing management system 100. Maps may include map information used for navigation purposes, for example, for calculating potential routes and guiding the users to a pick-off or drop-off location. Toll road information may include toll charges regarding certain roads, and any change or updates thereof. Toll road information may be used to calculate ride fares, for example, in cases where the user permits use of toll roads.

The data stored in database 170 may be transmitted to ridesharing management server 150 for accommodating ride requests. In some embodiments, database 170 may be stored in a cloud-based server (not shown) that is accessible by ridesharing management server 150 and/or mobile communications devices 120 through network 140. While database 170 is illustrated as an external device connected to ridesharing management server 150, database 170 may also reside within ridesharing management server 150 as an internal component of ridesharing management server 150.

As shown in FIG. 1, users 130A-130E may include a plurality of users 130A-130C, and a plurality of drivers 130D and 130E, who may communicate with one another, and with ridesharing management server 150 using various types of mobile communications devices 120. As an example, a mobile communications device 120 may include a display such as a television, tablet, computer monitor, video conferencing console, or laptop computer screen. A mobile communications device 120 may further include video/audio input devices such as a microphone, video camera, keyboard, web camera, or the like. For example, a mobile communications device 120 may include mobile devices such as a tablet or a smartphone having display and video/audio capture capabilities. A mobile communications device 120 may also include one or more software applications that facilitate the mobile communications devices to engage in communications, such as IM, VoIP, video conferences. For example, user devices 130A-130C may send requests to ridesharing management server 150 and receive confirmations therefrom. Drivers 130D and 130E may use their respective devices to receive ride service assignments and navigation information from ridesharing management server 150 and may contact the users with their respective devices 120D and 120E.

In some embodiments, a user may directly hail a vehicle by hand gesture or verbal communication, such as traditional street vehicle hailing. In such embodiments, once a driver accepts the request, the driver may then use his device to input the ride request information. Ridesharing management server 150 may receive such request information, and accordingly assign one or more additional ride service assignments to the same vehicle, for example, subsequent e-hail ride requests received from other mobile communications devices 120 through network 140.

In some embodiments, driver devices 120D and 120E, and driving-control device 120F may be embodied in a vehicle control panel, as a part of the vehicle control system associated with a particular vehicle. For example, a traditional taxi company may install a drive device in all taxi vehicles managed by the taxi company. In some embodiments, driver devices 120D and 120E, and driving-control device 120F, may be further coupled with a payment device, such as a card reader installed as a part of the vehicle control panel or as a separate device associated with the vehicle. A user may then use the payment device as an alternative payment mechanism. For example, a user who hails the taxi on the street may pay through the payment device, without using a user device providing ridesharing service.

Figure 2:
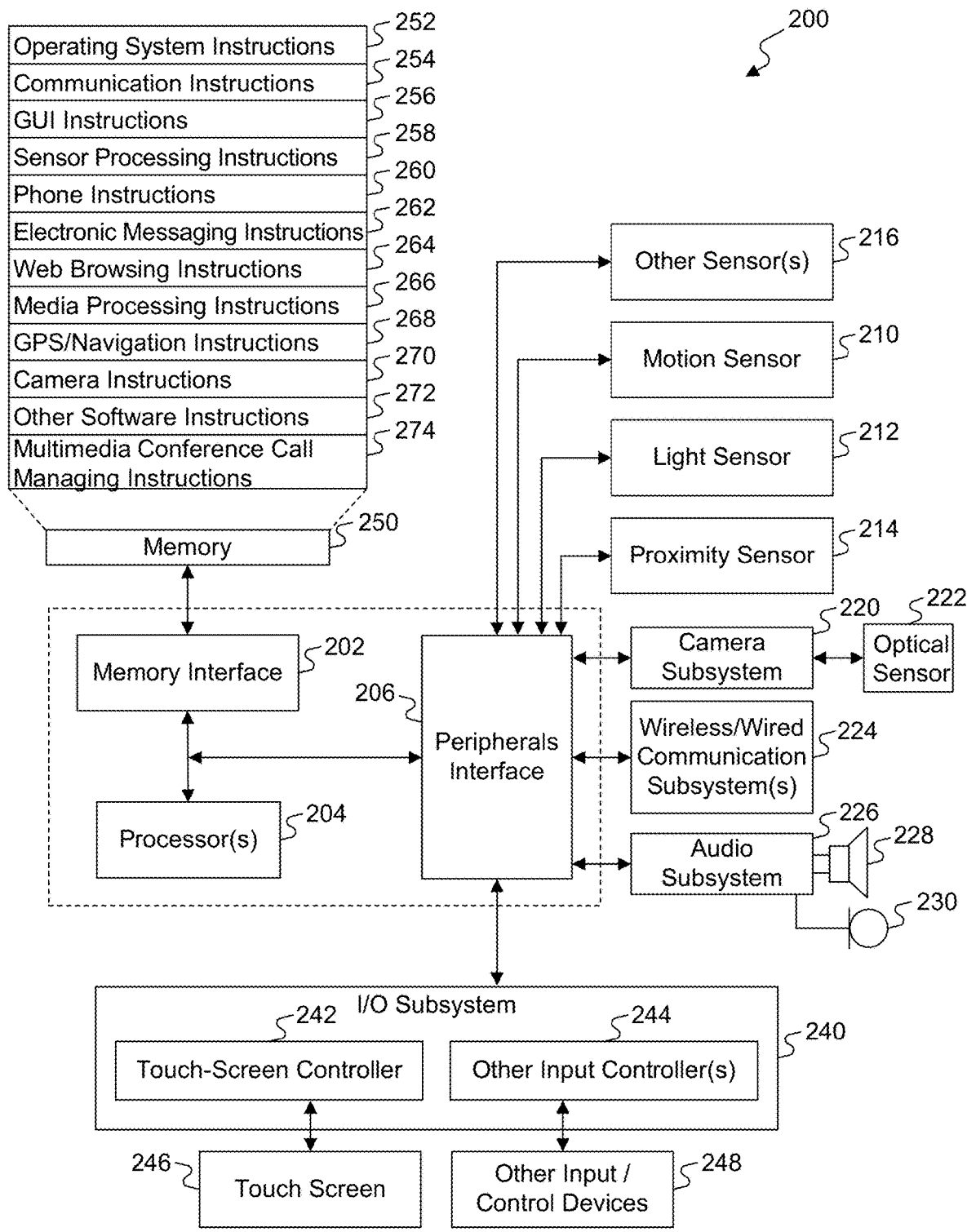
FIG. 2 is a diagram illustrating the components of an example mobile communications device associated with a ridesharing management system, in accordance with some embodiments of the present disclosure.

FIG. 2 is a diagram illustrating the components of an example mobile communications device 200 associated with a ridesharing management system, such as system 100 as shown in FIG. 1, in accordance with some embodiments of the present disclosure. Mobile communications device 200 may be used to implement computer programs, applications, methods, processes, or other software to perform embodiments described in the present disclosure, such as mobile communications devices 120A-120F. For example, user devices 120A-120C, driver devices 120D and 120E, and driving-control device 120F may respectively be installed with a user side ridesharing application, and a corresponding driver side ridesharing application.

Mobile communications device 200 may include a memory interface 202, one or more processors 204 such as data processors, image processors and/or central processing units, and a peripherals interface 206. Memory interface 202, one or more processors 204, and/or peripherals interface 206 can be separate components or can be integrated in one or more integrated circuits. The various components in mobile communications device 200 may be coupled by one or more communication buses or signal lines.

Sensors, devices, and subsystems can be coupled to peripherals interface 206 to facilitate multiple functionalities. For example, a motion sensor 210, a light sensor 212, and a proximity sensor 214 may be coupled to peripherals interface 206 to facilitate orientation, lighting, and proximity functions. Other sensors 216 may also be connected to peripherals interface 206, such as a positioning system (e.g., GPS receiver), a temperature sensor, a biometric sensor, or other sensing device, to facilitate related functionalities. A GPS receiver may be integrated with, or connected to, mobile communications device 200. For example, a GPS receiver may be included in mobile telephones, such as smartphone devices. GPS software may allow mobile telephones to use an internal or external GPS receiver (e.g., connecting via a serial port or Bluetooth). A camera subsystem 220 and an optical sensor 222, e.g., a charged coupled device ("CCD") or a complementary metal-oxide semiconductor ("CMOS") optical sensor, may be used to facilitate camera functions, such as recording photographs and video clips.

Communication functions may be facilitated through one or more wireless/wired communication subsystems 224, which may include a Ethernet port, radio frequency receivers and transmitters and/or optical (e.g., infrared) receivers and transmitters. The specific design and implementation of wireless/wired communication subsystem 224 may depend on the communication network(s) over which mobile communications device 200 is intended to operate. For example, in some embodiments, mobile communications device 200 may include wireless/wired communication subsystems 224 designed to operate over a GSM network, a GPRS network, an EDGE network, a Wi-Fi or WiMax network, and a Bluetooth® network.

An audio subsystem 226 may be coupled to a speaker 228 and a microphone 230 to facilitate voice-enabled functions, such as voice recognition, voice replication, digital recording, and telephony functions.

I/O subsystem 240 may include touch screen controller 242 and/or other input controller(s) 244. Touch screen controller 242 may be coupled to touch screen 246. Touch screen 246 and touch screen controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 246. While touch screen 246 is shown in FIG. 2, I/O subsystem 240 may include a display screen (e.g., CRT or LCD) in place of touch screen 246.

Other input controller(s) 244 may be coupled to other input/control devices 248, such as one or more buttons, rocker switches, thumb-wheel, infrared port, USB port, and/or a pointer device such as a stylus. Touch screen 246 may, for example, also be used to implement virtual or soft buttons and/or a keyboard.

Memory interface 202 may be coupled to memory 250. Memory 250 may include high-speed random-access memory and/or non-volatile memory, such as one or more magnetic disk storage devices, one or more optical storage devices, and/or flash memory (e.g., NAND, NOR). Memory 250 may store an operating system 252, such as DRAWIN, RTXC, LINUX, iOS, UNIX, OS X, WINDOWS, or an embedded operating system such as VXWorkS. Operating system 252 may include instructions for handling basic system services and for performing hardware dependent tasks. In some implementations, operating system 252 can be a kernel (e.g., UNIX kernel).

Memory 250 may also store communication instructions 254 to facilitate communicating with one or more additional devices, one or more computers and/or one or more servers. Memory 250 can include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/navigation instructions 268 to facilitate GPS and navigation-related processes and instructions; camera instructions 270 to facilitate camera-related processes and functions; and/or other software instructions 272 to facilitate other processes and functions.

In some embodiments, communication instructions 254 may include software applications to facilitate connection with ridesharing management server 150 that handles vehicle ridesharing requests. Graphical user interface instructions 256 may include a software program that facilitates a user associated with the mobile communications device to receive messages from ridesharing management server 150, provide user input, and so on. For example, a user may send ride requests and ride service parameters to ridesharing management server 150 and receive ridesharing proposals and confirmation messages. A driver may receive ride service assignments from ridesharing management server 150 and provide ride service status updates.

Each of the above identified instructions and applications may correspond to a set of instructions for performing one or more functions described above. These instructions need not be implemented as separate software programs, procedures, or modules. Memory 250 may include additional instructions or fewer instructions. Furthermore, various functions of mobile communications device 200 may be implemented in hardware and/or in software, including in one or more signal processing and/or application specific integrated circuits.

Figure 3:
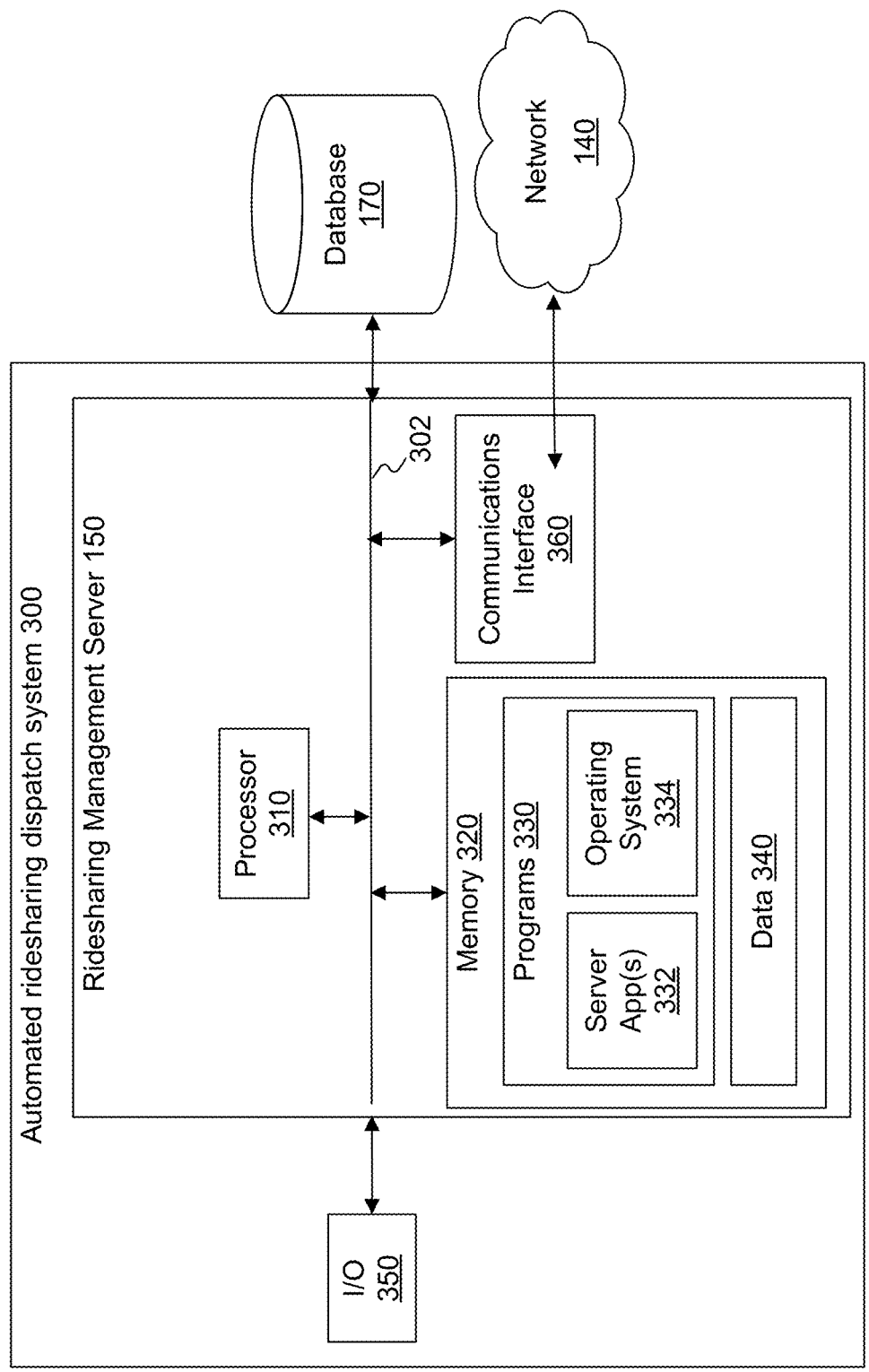
FIG. 3 is a diagram illustrating the components of an example ridesharing management server associated with a ridesharing management system, in accordance with some embodiments of the present disclosure.

FIG. 3 is a diagram illustrating the components of an example an automated ridesharing dispatch system 300 that may include ridesharing management server 150 associated with a ridesharing management system 100, in accordance with some embodiments of the present disclosure. Ridesharing management server 150 may include a bus 302 (or other communication mechanism), which interconnects subsystems and components for transferring information within ridesharing management server 150.

As shown in FIG. 3, automated ridesharing dispatch system 300 may include one or more processors 310, one or more memories 320 storing programs 330 including, for example, server app(s) 332, operating system 334, and data 340, and a communications interface 360 (e.g., a modem, Ethernet card, or any other interface configured to exchange data with a network, such as network 140 in FIG. 1). Automated ridesharing dispatch system 300 may communicate with an external database 170 (which, for some embodiments, may be included within ridesharing management server 150). Automated ridesharing dispatch system 300 may include a single server (e.g., ridesharing management server 150) or may be configured as a distributed computer system including multiple servers, server farms, clouds, or computers that interoperate to perform one or more of the processes and functionalities associated with the disclosed embodiments. The term "cloud server" refers to a computer platform that provides services via a network, such as the Internet. When ridesharing management server 150 is a cloud server it may use virtual machines that may not correspond to individual hardware. Specifically, computational and/or storage capabilities may be implemented by allocating appropriate portions of desirable computation/ storage power from a scalable repository, such as a data center or a distributed computing environment.

Processor 310 may be one or more processing devices configured to perform functions of the disclosed methods, such as a microprocessor manufactured by Intel™ or manufactured by AMD™. Processor 310 may comprise a single core or multiple core processors executing parallel processes simultaneously. For example, processor 310 may be a single core processor configured with virtual processing technologies. In certain embodiments, processor 310 may use logical processors to simultaneously execute and control multiple processes. Processor 310 may implement virtual machine technologies, or other technologies to provide the ability to execute, control, run, manipulate, store, etc. multiple software processes, applications, programs, etc. In some embodiments, processor 310 may include a multiple-core processor arrangement (e.g., dual, quad core, etc.) configured to provide parallel processing functionalities to allow ridesharing management server 150 to execute multiple processes simultaneously. It is appreciated that other types of processor arrangements could be implemented that provide for the capabilities disclosed herein.

Memory 320 may be a volatile or non-volatile, magnetic, semiconductor, tape, optical, removable, non-removable, or other type of storage device or tangible or non-transitory computer-readable medium that stores one or more program(s) 330 such as server apps 332 and operating system 334, and data 340. Common forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Ridesharing management server 150 may include one or more storage devices configured to store information used by processor 310 (or other components) to perform certain functions related to the disclosed embodiments. For example, ridesharing management server 150 may include memory 320 that may include instructions to enable processor 310 to execute one or more applications, such as server apps 332, operating system 334, and any other type of application or software known to be available on computer systems. Alternatively or additionally, the instructions, application programs, etc., may be stored in an external database 170 (which can also be internal to ridesharing management server 150) or external storage communicatively coupled with ridesharing management server 150 (not shown), such as one or more database or memory accessible over network 140.

Database 170 or other external storage may be a volatile or non-volatile, magnetic, semiconductor, tape, optical, removable, non-removable, or other type of storage device or tangible or non-transitory computer-readable medium. Memory 320 and database 170 may include one or more memory devices that store data and instructions used to perform one or more features of the disclosed embodiments. Memory 320 and database 170 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, ridesharing management server 150 may be communicatively connected to one or more remote memory devices (e.g., remote databases (not shown)) through network 140 or a different network. The remote memory devices can be configured to store information that ridesharing management server 150 can access and/or manage. By way of example, the remote memory devices may include document management systems, Microsoft SQL database, SharePoint databases, Oracle™ databases, Sybase™ databases, or other relational databases. Systems and methods consistent with disclosed embodiments, however, are not limited to separate databases or even to the use of a database.

Programs 330 may include one or more software modules causing processor 310 to perform one or more functions of the disclosed embodiments. Moreover, processor 310 may execute one or more programs located remotely from one or more components of the ridesharing management system 100. For example, ridesharing management server 150 may access one or more remote programs that, when executed, perform functions related to disclosed embodiments.

In the presently described embodiment, server app(s) 332 may cause processor 310 to perform one or more functions of the disclosed methods. For example, devices associated with users, drivers and autonomous vehicles may respectively be installed with user applications for vehicle ridesharing services, and driver applications for vehicle ridesharing services. Further, a mobile communications device may be installed with both the driver applications and the user applications, for uses in corresponding situations.

In some embodiments, other components of ridesharing management system 100 may be configured to perform one or more functions of the disclosed methods. For example, mobile communications devices 120 may be configured to calculate estimate pick-up and drop-off times based on a certain ride request and may be configured to calculate estimate ride fares. As another example, mobile communications devices 120 may further be configured to provide navigation service, and location service, such as directing the user to a particular pick-up or drop-off location and providing information about a current location of the respective user or vehicle to ridesharing management server 150.

In some embodiments, program(s) 330 may include operating system 334 performing operating system functions when executed by one or more processors such as processor 310. By way of example, operating system 334 may include Microsoft Windows™, Unix™, Linux™, Apple™ operating systems, Personal Digital Assistant (PDA) type operating systems, such as Apple iOS, Google Android, Blackberry OS, Microsoft CE™, or other types of operating systems. Accordingly, the disclosed embodiments may operate and function with computer systems running any type of operating system 334. Ridesharing management server 150 may also include software that, when executed by a processor, provides communications with network 140 through communications interface 360 and/or a direct connection to one or more mobile communications devices 120. Specifically, communications interface 360 may be configured to receive ride requests (e.g., from user devices 120A-120C) headed to differing destinations and receive indications of the current locations of the ridesharing vehicles (e.g., from driver devices 120D and 120E or driving-control device 120F). In one example, communications interface 360 may be configured to continuously or periodically receive current vehicle location data for the plurality of ridesharing vehicles that are part of ridesharing management system 100. The current vehicle location data may include global positioning system (GPS) data generated by at least one GPS component of a mobile communications device 120 associated with each ridesharing vehicle.

In some embodiments, data 340 may include, for example, profiles of users, such as user profiles or driver profiles. Data 340 may further include ride requests from a plurality of users, user ride history and driver service record, and communications between a driver and a user regarding a particular ride request. In some embodiments, data 340 may further include traffic data, toll road information, and navigation information, which may be used for handling and accommodating ride requests.

Automated ridesharing dispatch system 300 may also include one or more I/O devices 350 having one or more interfaces for receiving signals or input from devices and providing signals or output to one or more devices that allow data to be received and/or transmitted by automated ridesharing dispatch system 300. For example, automated ridesharing dispatch system 300 may include interface components for interfacing with one or more input devices, such as one or more keyboards, mouse devices, and the like, that enable automated ridesharing dispatch system 300 to receive input from an operator or administrator (not shown).

Figure 4A:
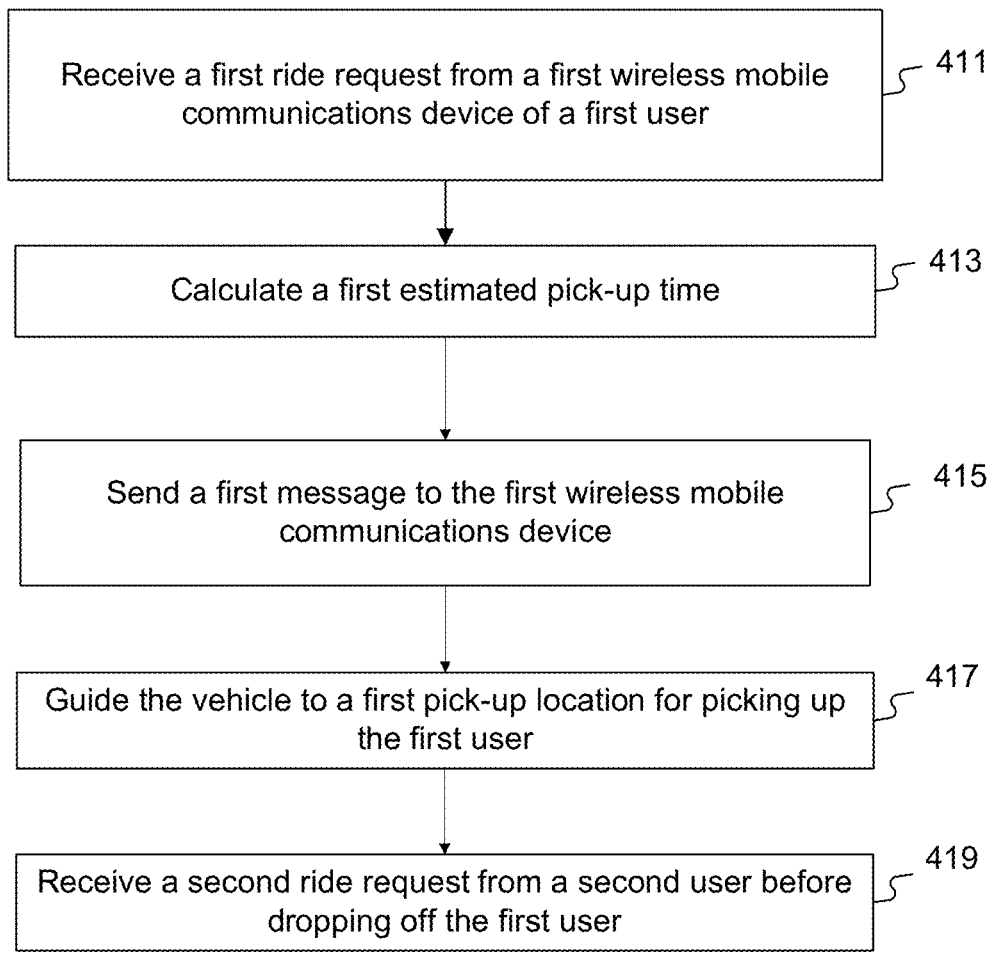
FIGS. 4A and 4B are flowcharts of example processes for vehicle ridesharing management, in accordance with some embodiments of the present disclosure.
Figure 4B:
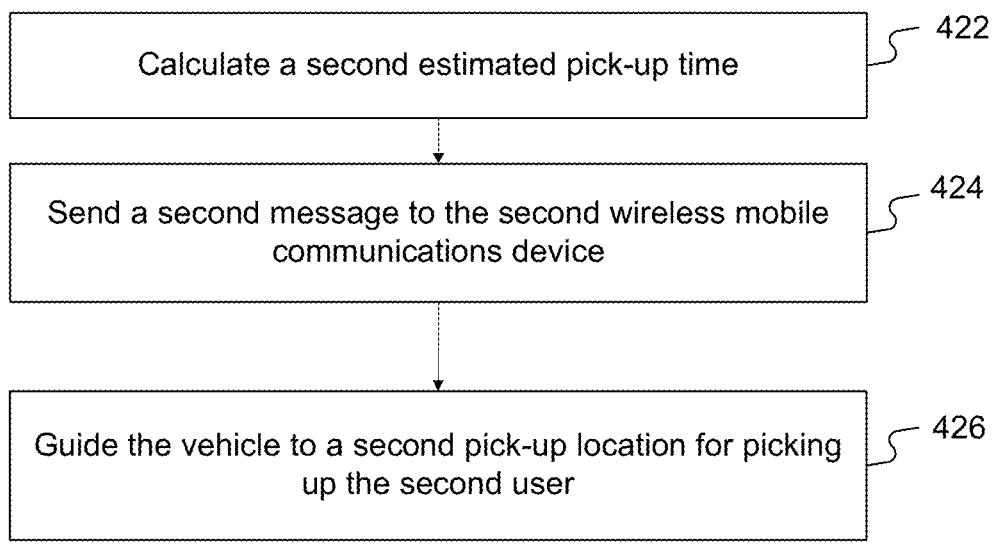

FIGS. 4A and 4B are flowcharts of example processes 410 and 420 for vehicle ridesharing management, in accordance with some embodiments of the present disclosure. In one embodiment, all of the steps of process 400 may be performed by a ridesharing management server, such as ridesharing management server 150 described above with reference to FIGS. 1 and 3. Alternatively, at least some of the steps of process 400 may be performed by a mobile communications device, such as the mobile communications devices 120 described above with reference to FIGS. 1 and 2. In the following description, reference is made to certain components of FIGS. 1-3 for purposes of illustration. It will be appreciated, however, that other implementations are possible and that other components may be utilized to implement example methods disclosed herein.

At step 411, ridesharing management server 150 may receive a first ride request from a first wireless communication of a first user, for example, a request from user 130A sent through user device 120A. The first ride request may include a first starting point and a first desired destination. A ride request may refer to a request from a user needing transportation service from a certain location to another. A starting point may refer to a current location of the user, as input by the user through an input device of an associated user device, or as determined by a location service application installed on the user device. In some embodiments, the starting point may be a location different from the current location of the user, for example, a location where the user will subsequently arrive at (e.g., entrance of a building). A desired destination may refer to a location where the user requests to be taken to.

In some embodiments, the actual pick-up location and the actual drop-off location may be different from the starting point and the desired destination. For example, the pick-up location may be of a certain distance from the starting point, where the user may be directed to for pick-up. By encouraging the user to walk to a pick-up location nearby, consistent with some embodiments, the vehicle may more easily and quickly locate the user without excessive detour, or causing excessive delay for users who are in the vehicle. Similarly, by encouraging the user to walk from a drop-off location different from but within a certain distance from the desired destination, the vehicle may be able to accommodate subsequent pick-ups, or arrive at the subsequent pick-up locations more quickly. The vehicle ridesharing service management system may provide incentives or rewards for the user who are willing to walk a certain distance. For example, the ridesharing management system may offer certain discounts based on the number and distances of the walks involved in a particular ride. Alternatively, the ridesharing management system may offer ride credits corresponding to the number and distance of the walks undertaken by the user during his rides. The user may use the credits for subsequent ride payment, or redeem the credit for money, free rides, or other rewards. Further, advantages of such embodiments may include more efficient vehicle use and management, more user flexibility, and less air pollution associated with vehicle use.

In some embodiments, prior to or after the user sends a ride request to ridesharing management server 150, the user may further input ride service parameters through, for example, a settings component provided on a user interface. Ride service parameters refer to user preference parameters regarding a vehicle ridesharing service, for example, a maximum walking distance from the starting point to a pick-up location, a maximum walking distance from a drop-off location to a desired destination, a total maximum walking distance involved in a ride, a maximum number of subsequent pick-ups, maximum delay of arrival/detour incurred by subsequent pick-ups during a ride, and a selection whether to permit toll road usage during the ride, etc.

Ride service parameters may be transmitted to ridesharing management server 150 for processing the request and assignment of an available vehicle based on the ride service parameters. For example, a ride request may be associated with a maximum walking distance of 300 meters from a starting point to a pick-up location. When assigning an available vehicle to pick up the user, ridesharing management server 150 may include in the assignment an assigned pick-up location within 300 meters or less of the starting point. Similarly, a ride request may be associated with a maximum walking distance of 0.5 mile from a drop-off location to a desired destination. When assigning an available vehicle to pick up the user, ridesharing management server 150 may include in the assignment an assigned drop-off location within 0.5 mile or less from the desired destination.

For requests associated with a maximum total walking distance of one mile during the ride, when assigning an available vehicle to pick up the user, ridesharing management server 150 may include in the assignment an assigned pick-up location and an assigned drop-off location, a total of a distance from the starting point to the assigned pick-up location and a distance from the assigned drop-off location to a desired destination may be equal to or less than one mile.

In the above examples, the values regarding the walking distances are only exemplary. Other embodiments consistent with the present disclosure may use different options of the distances and may provide a list of options. The distances may further be measured in different units, for example, miles, meters, kilometers, blocks, and feet, etc., which are not limited by the disclosed embodiments herein. In some embodiments, the distance may further be represented by an average walking time from a certain location to another, based on average walking speed, for example, ten minutes, five minutes, etc.

With respect to parameters regarding subsequent pick-ups, such as a maximum number of subsequent pick-ups, and maximum delay of arrival incurred by subsequent pick-ups, ridesharing management server 150 may assign subsequent pick-ups accordingly, without exceeding the parameters set by the user. For example, a ride request may be associated with a maximum number of two subsequent pick-ups during the ride. Ridesharing management server 150 may monitor the service status of the vehicle assigned to pick up the user, and refrain from assigning a third subsequent pick-up before the vehicle arrives at the a drop-off location for dropping off the user. As another example, for a ride request associated with a maximum delay of arrival of ten minutes, when assigning subsequent ride requests, ridesharing management server 150 may calculate an estimated delay that may occur to the user if the same vehicle was to undertake the subsequent ride request. If the estimated delay that may occur to the user is more than ten minutes, ridesharing management server 150 may assign the subsequent ride request to other available vehicles.

In some embodiments, the user may also input selection of toll road usage through the associated user device, to allow or disallow use of toll roads. Ridesharing management server 150 may then take the user's selection into account when assigning an available vehicle for accommodating the ride request, determining travel route, and calculating ride fare for the user. For example, ridesharing management server 150 may adjust the ride fare amount for a corresponding user based on the toll roads selection input and toll charges involved. For another example, if a first user does not permit toll road usage, before any subsequent pick-ups during the ride, ridesharing management server 150 may send a route to an assigned vehicle that does not include toll roads. For another example, if a subsequent user sharing the ride permits usage of toll road, ridesharing management server 150 may not charge the first user for any overlap portion of the ride where toll roads are used, change the route to include toll roads after the first user is dropped off, or assign the second user to a ridesharing vehicle with users that permit toll road usage.

In some embodiments, the ride request information may also be input from the driver device, for example, driver device 120D, or from a device associated with the vehicle. In the case of street hailing, where the user hails a vehicle on the street without using a vehicle ridesharing service application on a mobile communications device, the driver, for example, driver 130D, may input information such as the starting point/pick-up information and destination information through driver device 120D, which may then be transmitted to ridesharing management server 150.

At step 413, ridesharing management server 150 may calculate an estimated pick-up time, for example, based on a current location of an assigned vehicle and the first starting point included in the first ride request. An estimated pick-up time may refer to a time period before an assigned vehicle arrives at a pick-up location for picking up the user.

The assigned vehicle may refer to the vehicle that is assigned to undertake the first ride request, for example, a taxi in a taxi fleet, one of a plurality of vehicles managed by a transportation service system, or a plurality of vehicles owned by a plurality of owners and used to provide ridesharing services. The pick-up location may be the same as the starting point, or an assigned pick-up location associated with the starting point.

The estimated pick-up time may be determined based on a distance between a current location of the assigned vehicle and the pick-up location, and an estimate speed of traveling along the route between the two locations. The current location of the assigned vehicle may be determined by a location service application installed on a driver device, a driving-control device, or by a location determination component in the ridesharing management system 100, which may be a part of or separate from ridesharing management server 150. In some embodiments, the estimated pick-up time may further be determined based on historical or real-time traffic data, and a route currently followed by the vehicle.

In some embodiments, process 410 may further include locating one or a plurality of potential available vehicles and selecting an assigned vehicle therefrom. For example, potential available vehicles may include vacant vehicles in the surrounding areas of the first starting point, and vehicles heading to a location close to the first starting point for assigned pick-ups or drop-offs. Ridesharing management server 150 may filter potential available vehicles by ride service parameters set by the users who are inside the vehicle, for example, removing occupied vehicles where a user inside the vehicle does not permit subsequent pick-ups, or occupied vehicles where the user requires a minimal delay. In some embodiments, ridesharing management server 150 may filter potential assignment vehicles by choosing a vehicle that would involve minimal walking of the user or walking without the need of crossing the street. In some embodiments, ridesharing management server 150 may further filter potential assignment vehicles by choosing a vehicle that would involve minimal detour for the vehicle to arrive at the pick-up location. In some embodiments, the assigned vehicle may be selected by applying multiple filter criteria, or by applying multiple filter criteria in a certain order.

In some embodiments, the pick-up location may be an assigned pick-up location different from the first starting point, for example, half a block or further away from the first starting point. Ridesharing management server 150 may assign a pick-up location based on ride service parameters set by the first user, as described above at step 411. Ridesharing management server 150 may further assign a pick-up location which is along a main street where an assigned vehicle can easily locate, or a location which would not require an assign vehicle to take a U-turn. In cases where there are one or more other users in the vehicle, ridesharing management server 150 may assign a pick-up location close to the vehicle's next assigned drop-off, or on the side of a street where the vehicle will soon go through. In some embodiments, ridesharing management server 150 may adjust selection of the pick-up location based on filtering results of potential assignment vehicles, or vice versa. The two selection processes may complement each other to reach one or more optimal combinations.

In some embodiments, where there are multiple potential assignment vehicles, each with a corresponding potential pick-up location, an estimated pick-up time may be respectively calculated corresponding to each of the potential assignment vehicles. Ridesharing management server 150 may then choose the vehicle with the shortest estimated pick-up time to be the assigned vehicle.

At step 415, ridesharing management server 150 may send a first message to a user device associated with the first user, which is, in this example, user device 120A. The first message may be configured to cause an indication of the calculated first estimated pick-up time to appear on a display of user device 120A. The message may appear in different formats, for example, a text message including the estimated pick-up time, an audio message, or an image, the specific implementation of which are not limited by the disclosed embodiments herein.

In one embodiment, the message may include a confirmation that the ridesharing request is accepted. If ridesharing management server 150 assigns a pick-up location different from the starting point, the message may further cause the display of an indication of the assigned pick-up location. Ridesharing management server 150 may further provide a navigation option which may be displayed on a user interface. A selection of the navigation option may then provide walking directions the user to the assigned pick-up location for pick-up. The message may further cause a display of an indication of an estimated walking distance from the starting point to the assigned pick-up location. In addition, the message may include an estimated walking distance from the assigned drop-off location to the desired destination. The assigned drop-off location may be a location close to the desired destination, within the maximum walking distance parameters set by the first user. For example, the drop-off location may be at a location half a block away or further from the desired destination and may be along a main street where the vehicle may easily locate and access. For another example, the drop-off location may be determined based on a route towards the next pick-up location, such that the vehicle may easily drop off the first user on its way to the next pick-up location, thereby avoiding an extra detour.

In another embodiment, the message may include one or more proposals associated with different vehicles. Each proposal may include information about the proposed pick-up location. The information about the proposed pick-up location may include the distance from the user to the proposed pick-up location. Each proposal may include a price of the ride associated with the type of the ride, and an estimation of a pick-up time. The estimate may be presented as a range. In one example, each proposal may include different pick-up locations, different prices, and/or different estimations of a pick-up time. According to this embodiment, step 415 may also include receiving a proposal selection reflective of a selected pick-up vehicle and sending an addition message that may include information about the selected vehicle, and the driver associated with the vehicle. For example, the vehicle information may include the license plate number, brand, color, and/or model of the vehicle. The driver information may include a name, nickname, profile photo, ratings, number of previous rides, and/or contact information of the driver. The message may further include a contact option allowing the user to contact the driver, for example, a "contact the driver" button, which the user may select to initiate a communication session with the driver.

At step 417, ridesharing management server 150 may guide the assigned vehicle to the first pick-up location for picking up the first user. For example, ridesharing management server 150 may transmit direction information to the driver device associated with the assigned vehicle, for example, driver device 120D or driving-control device 120F. In some embodiments, a navigation component of the driver device, or the driving-control device may perform the step of guiding the vehicle to the first pick-up location. Correspondingly, ridesharing management server 150, or a navigation component of the user device 120A, may guide the user to the first pick-up location, in cases where the pick-up location is an assigned pick-location different from the first starting point. For example, for autonomous vehicles used for ridesharing services, such as autonomous vehicle 130F as shown in FIG. 1, the vehicle itself may be capable of using a variety of techniques to detect its surroundings, identify feasible paths, and navigate without direct human input.

In some embodiments, once the vehicle is assigned to pick up the user, ridesharing management server 150 may assign a communication channel for the driver associated with the assigned vehicle to communicate with the user, for example, a masked phone number. In some embodiments, a user interface of a driver device, such as driver device 120D, may include an option to send notification messages to the user, for example, a pre-defined message button of "I'm here." Once the vehicle arrives at the pick-up location, the driver may click the message button to send the message to the user. This way, the driver may not need to dial out or type a message in order to notify the user of the vehicle's arrival, reducing driver distraction and associated safety hazards.

At step 419, ridesharing management server 150 may receive a second ride request from a second user. In some embodiments, the second user request may be a street hailing request received directly by the vehicle while the first user is still inside, namely, before dropping off the first user. The vehicle may then undertake the second ride request, if the first user permits subsequent pick-ups. In some embodiments, the driver of the vehicle may input the second ride request information through a driver device, for example, driver device 120D associated with driver 130D. The input may inform ridesharing management server 150 that the vehicle has undertaken a second ride request or may further include the pick-up location and destination information of the second user. Ridesharing management server 150 may then accordingly determine whether to assign additional pick-ups to the same vehicle and may further send direction information guiding the vehicle to the second user's destination.

In some embodiments, the second ride request may be received by ridesharing management server 150 from a second wireless mobile communications device, for example, user device 120B associated with user 130B as shown in FIG. 1. The second ride request may further include a second starting point, and a second desired destination. Ridesharing management server 150 may then assign a corresponding ride service to an available vehicle, which may be the vehicle that has picked up the first user, before dropping off the first user. In processing the second ride request, the example process 420 as shown in FIG. 4B may be performed.

At step 422, ridesharing management server 150 may calculate a second estimated pick-up time, for example, based on a second current location of the vehicle and the second starting point. The second estimated pick-up time may refer to an estimated time period before the vehicle arrives at a second pick-up location for picking up the second user. The second pick-up location may be an assigned pick-up location different from, but associated with, the second starting point. Assignment of the second pick-up location may include similar steps as described above with reference to FIG. 4A, details of which are not repeated herein.

At step 424, ridesharing management server 150 may send a second message to the second wireless mobile communication device, which is user device 120B in this example. The second message may be configured to cause an indication of the calculated second estimated pick-up time to appear on a display of the second wireless mobile communication device. As described above with reference to FIG. 4A, the message may appear in different formats, and may further cause a display of multiple proposals with multiple options for the second pick-up location, walking distance, walking directions from the second starting point to the second pick-up location, etc., the details of which are not repeated herein.

In some embodiments, ridesharing management server 150 may set the second pick-up location at substantially the same location as the first pick-up location, for example, half a block away, or 100 meters away from the first pick-up location. This way, the vehicle may pick up both users at about the same time at substantially the same location, further improving service efficiency. In some embodiments, ridesharing management server 150 may set the second pick-up location at a substantially same location as the first drop-off location, wherein the vehicle may drop off the first user, and pick up the second user at about the same time, without extra travelling. Further, in some embodiments, the second drop-off location may be set at substantially the same location as the first drop off location, such that the vehicle may drop off multiple users at the same time.

In some embodiments, ridesharing management server 150 may set the first pick-up location to substantially differ from the first starting point, and the second pick-up location to substantially differ from the second starting point, for example, to ensure both pick-up locations are along the same side of the same street where the vehicle may go through. Ridesharing management server 150 may then send respective directions to the first user device and the second user device, to guide the users to the respective pick-up locations.

In some embodiments, ridesharing management server 150 may set the first pick-up location at substantially the same as the first starting point and set the second pick-up location to substantially differ from the second starting point. For example, the selection of the pick-up locations may be made such that the first pick-up location and the second pick-up location are close to one another, both pick-up locations are along the same street, or the second pick-up location is close to the first drop-off location. Ridesharing management server 150 may then send respective directions to the first user device and the second user device, to guide the users to the respective pick-up locations.

At step 426, ridesharing management server 150 may guide the vehicle to a second pick-up location for picking up the second user. As described above with reference to FIG. 4A, this step may also be performed by a navigation component of the driver's device (e.g., driver device 120D or driving-control device 120F associated with autonomous vehicle 130F).

In some embodiments, ridesharing management server 150 may change the first drop-off location after receiving the second ride request, and the change may be made without pre-approval of the first user. The first drop-off location refers to a location for dropping off the first user. As described above with reference to FIG. 4A, the first drop-off location may be the same as the first desired destination, or at a location different from the first desired destination.

For example, the second pick-up location may be set at a location close to the first desired destination, included in the first ride request. When assigning the second ride request to the vehicle, ridesharing management server 150 may change the first drop-off location to a location closer to or at the first desired destination, thus reducing the walking distance for the first user to arrive at his desired destination. For another example, the first drop-off location may be changed to a location where the first user does not need to cross the street to arrive at his desired destination, without causing or increasing detour for the vehicle to arrive at the second pick-up location.

In some embodiments, ridesharing management system 100 may subsequently receive a plurality of subsequent ride requests. These additional ride requests may either be received by ridesharing management server 150 and assigned to the vehicles or received by the vehicles in the form of street hailing. Steps described above with reference to FIGS. 4A and 4B may similarly be used to process the third ride request.

For example, ridesharing management server 150 may receive a third ride request from a third user device, for example, user device 120C associated with user 130C, as shown in FIG. 1. Ridesharing management server 150 may process the request and assign the request to the vehicle while at least one of a first user and a second user is still in the vehicle. The third ride request may further include a third starting point and a third desired destination. Ridesharing management server 150 may calculate a third estimated pick-up time and send a confirmation to a user's device (e.g., user device 120C). Ridesharing management server 150 may transmit direction and route information to the driver's device associated with the vehicle (e.g., driver device 120D as shown in FIG. 1), to guide the vehicle to pick up and drop off user 130C.

As described above with reference to FIGS. 4A and 4B, processing of subsequent ride requests may take into account of the ride service parameters set by the users whose requests have previously been received and assigned. For example, if both the first user and the second user are still in the vehicle, and one of them has set a maximum delay of arrival, ridesharing management server 150 may not assign the third request to the same vehicle if such assignment would cause a delay longer than the set value. For example, if the first user has set a maximum delay of arrival of 10 minutes, ridesharing management server 150 may calculate an estimated time period it takes for the vehicle to pick up (and/or drop off) the third user before dropping off the first user. If the estimated time would cause a total delay of arrival for the first user to exceed 10 minutes, ridesharing management server 150 may therefore assign the third ride request to another vehicle. For another example, if the second user has set a maximum number of one co-rider and the second user will be dropped off earlier than the first user, ridesharing management server 150 may not assign to the same vehicle, as such assignment may cause violation of the parameter (maximum number of one co-rider) set by the second user.

Figure 5:
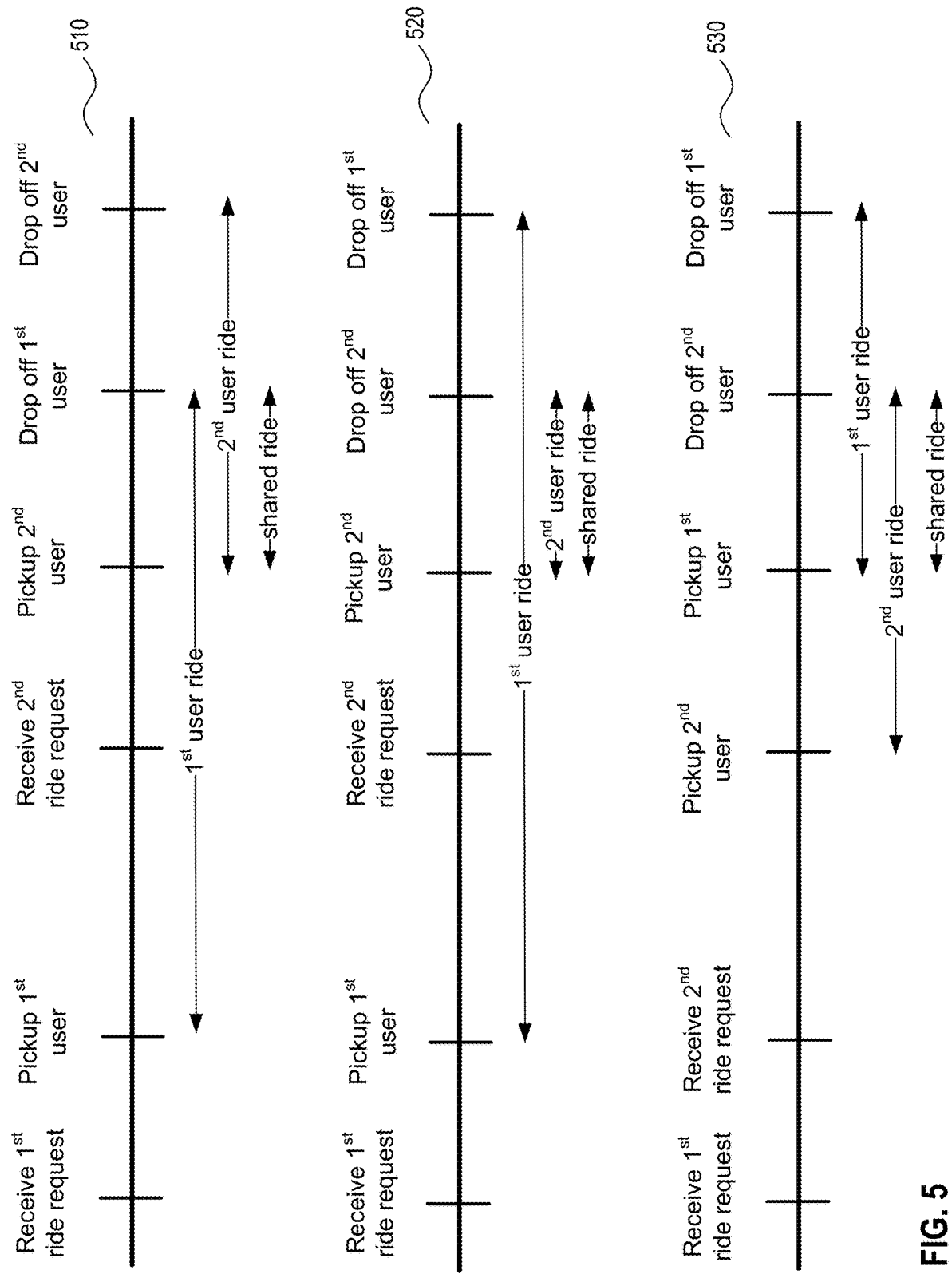
FIG. 5 is a diagram of example timelines showing ridesharing arrangements, in accordance with some embodiments of the present disclosure.

FIG. 5 is a diagram of three example timelines showing ridesharing arrangements, in accordance with some embodiments of the present disclosure. As shown in example timelines 510, 520, and 530, for a particular assigned vehicle undertaking a first ride request from a first user and a second ride request from a second user, the order of pick-ups and drop-offs for the second user may vary. For example, ridesharing management server 150 may receive a plurality of ride requests, design an optimal path and pick-up/drop-off order for a particular assigned vehicle undertaking multiple requests, and assign additional pick-ups as the vehicle completes a part of or all of the ride requests. For example, as shown in example timeline 510, a vehicle may receive a second ride request after picking up the first user and drop off the first user before dropping off the second user. A corresponding shared ride portion may be the portion of ride between the pick-up of the second user and drop-off of the first user. As shown in example timeline 520, the vehicle may receive a second ride request after picking up the first user and drop off the second user before dropping off the first user. A corresponding shared ride portion may be the portion of ride between the pick-up of the second user and drop-off the second user. As another example, as shown in example timeline 530, the vehicle may receive the first ride request and the second ride request before any pick-up. The vehicle may then pick up the second user before picking up the first user and drop off the second user before dropping off the first user. A corresponding shared ride portion may be the portion of ride between pick-up of the first user and drop-off of the second user. Depending on the order of pick-ups and drop-offs, the ridesharing management server may then determine a corresponding shared ride portion, and calculate ride fare for each user based on, for example, the shared portion, solo portion of each user, and/or other factors such as the ride service parameters set by each user.

Embodiments of the present disclosure may allow a vehicle management system to run a transportation simulation. For example, the vehicle management system may receive a first input of a geographical area and access map information of roadways in the geographical area. The vehicle management system may also receive a second input indicative of at least one scenario of ridesharing demand in the geographical area and receive a third input indicative of a plurality of virtual vehicles designated to transport virtual passengers associated with the at least one scenario of ridesharing demand in the geographical area. The vehicle management system may further initiate a transportation simulation of the at least one scenario of ridesharing demand in the geographic area. The transportation simulation may simulate rides of the virtual vehicles transporting the virtual passengers along the roadways. The vehicle management system may also determine a performance level associated with the virtual vehicles based on the transportation simulation. The vehicle management system may additionally provide an output representative of the determined performance level.

As another example, the vehicle management system may receive a first input of a geographical area and access map information of roadways in the geographical area. The vehicle management system may also receive a second input indicative of real-time ridesharing demand from a plurality of users in the geographical area and receive a third input indicative of values for a plurality of service parameters. The vehicle management system may further identify at least one user that the ridesharing vehicles cannot pick-up under the values for the service parameters. The vehicle management system may also initiate at least one transportation simulation based on the real-time ridesharing demand using different values for the plurality of service parameters. The vehicle management system may additionally provide a recommendation based on one or more results of the at least one transportation simulation.

Figure 6:
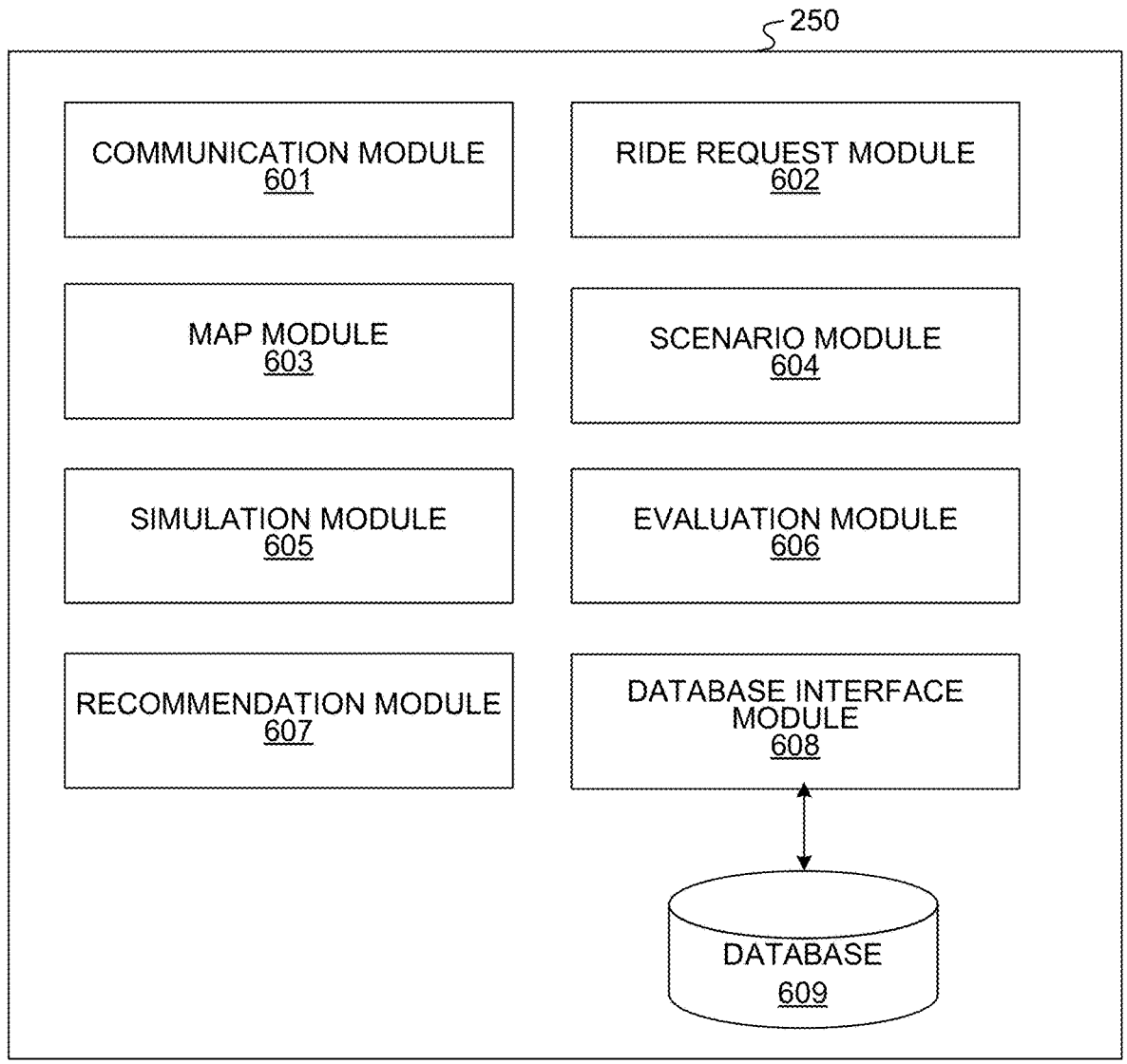
FIG. 6 is an example of a memory containing software modules, in accordance with some embodiments of the present disclosure.

FIG. 6 depicts an embodiment of memory module 250 for initiating a transportation simulation consistent with the present disclosure. Memory 250 may store a plurality of modules that may be executable by at least one processor to perform various methods and processes disclosed herein. Further, it should be noted that memory 250 may store more or fewer modules than those shown in FIG. 6, depending on implementation-specific considerations.

As illustrated in FIG. 6, memory 250 may store software instructions to execute a communication module 601, a ride request module 602, a map module 603, a scenario module 604, a simulation module 605, an evaluation module 606, a recommendation module 607, a database interface module 608, and may include a database 609. Communication module 601 may include software instruction for communicating with other components of ridesharing management system 100 (e.g., one or more user devices 120A-120C, driver devices 120D and 120E, driving-control device 120F). Ride request module 602 may include software instruction for receiving ride requests from a plurality of users. Map module 603 may include software instruction for receiving a first input of a geographical area. Scenario module 604 may include software instruction for receiving a second input indicative of at least one scenario of ridesharing demand in the geographical area. Simulation module 605 may include software instruction for initiating a transportation simulation of the at least one scenario of ridesharing demand in the geographic area to simulate rides of the plurality of virtual vehicles transporting the virtual passengers along the roadway. Evaluation module 606 may include software instruction for determining a performance level associated with the plurality of virtual vehicles, based on the transportation simulation. Recommendation module 607 may include software instruction for determining and outputting recommendations for improving the performance level. Database interface module 608 may include software instruction executable to interact with database 609, to store and/or receive information.

Communication module 601 may include software instructions for facilitating communications between the device on which it is implemented (e.g., ridesharing management server 150) and another component of ridesharing management system 100 (e.g., mobile communications devices 120A-120F, one or more vehicles, database 170). For example, ridesharing management server 150 may receive a plurality of requests for a ride from a plurality of users (via, e.g., mobile communications devices associated with the users) via communication module 601. As another example, ridesharing management server 150 may electronically assign a specific user to a specific vehicle via communication module 601.

Ride request module 602 may include software instructions for receiving a plurality of requests for a ride from a plurality of users. Each ride request may include a starting point and a desired destination within the geographic area. In some embodiments, ride request module 602 may determine a pick-up location and a drop-off location. The determined pick-up location may be at a location other than but in proximity to the starting point and the determined drop-off location may be at a location other than but in proximity to the desired destination. Additionally or alternatively, ride request module 602 may determine the drop-off location for a user based on a location of a charging station and the desired destination of the ride request. For example, in one embodiment, a ride request may include information that the desired destination is a building at the corner of an intersection of two cross streets. Ride request module 602 may determine that dropping the user off at the intersection would result in the vehicle entering a one-way street, impeding a more efficient route to a charging station. Thus, ride request module 602 may instead, for example, drop the user off at a location proximal to the desired destination, and avoid entering the one-way street. Ride request module 602 may also electronically assign ride requests to one or more vehicles.

Figure 7:
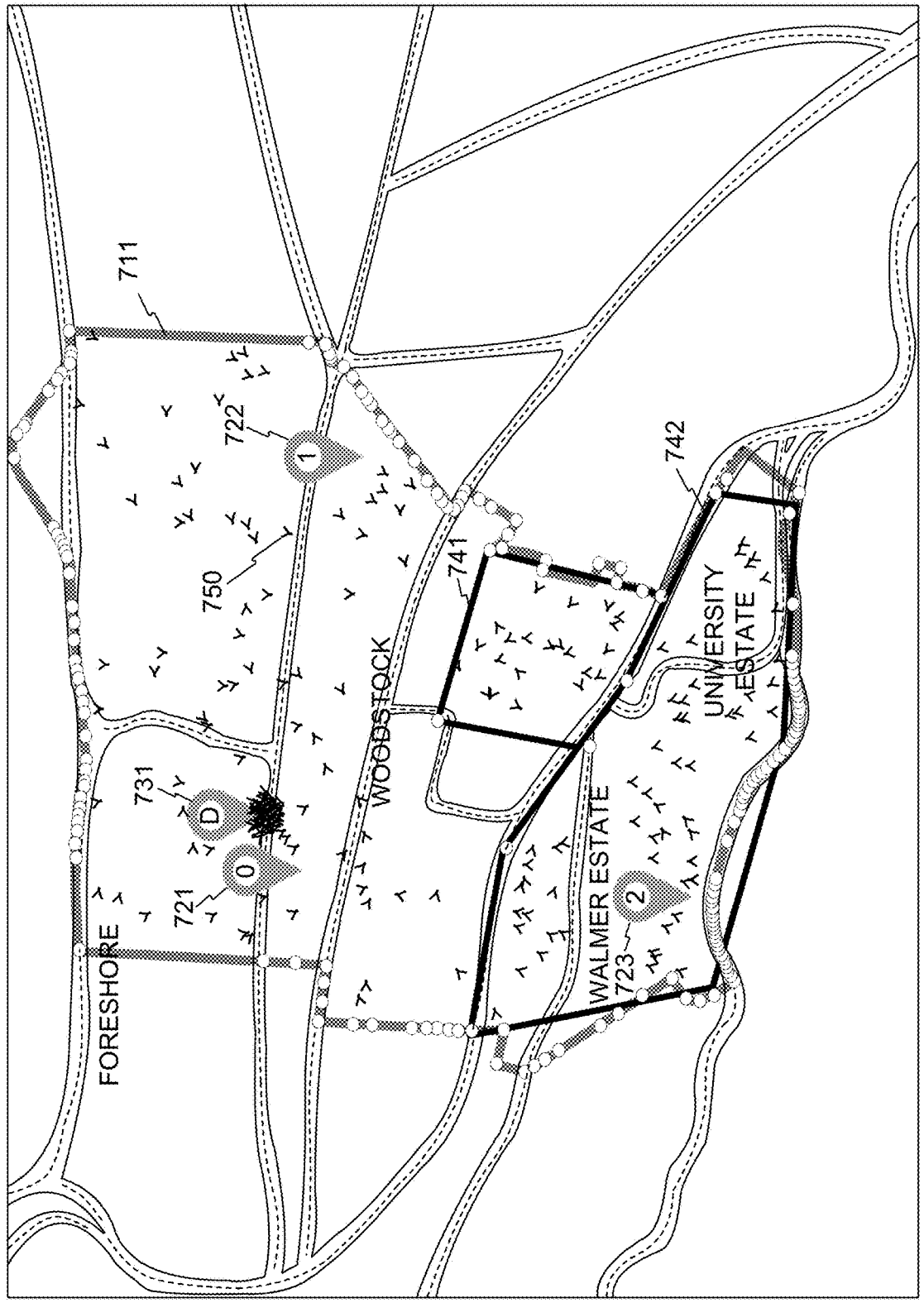
FIG. 7 is a diagram illustrating an example user interface showing an exemplary geographic area, in accordance with some embodiments of the present disclosure.

Map module 603 may include software instructions for receiving a first input of a geographical area. For example, map module 603 may receive an input from a user via I/O 350 indicating Woodstock in Cape Town, South Africa as the geographical area. Map module 603 may determine the geographical area based on the received input. By way of example, map module 603 may determine the area of Woodstock as the geographical area (geographical area 711 as illustrated in FIG. 7).

Scenario module 604 may include software instructions for receiving a second input indicative of at least one scenario of ridesharing demand in the geographical area. A scenario may include a plurality of service parameters. For example, a scenario may include service parameters relating to one or more passengers (virtual and/or real), one or more ride requests (virtual and/or real), one or more ridesharing vehicles (virtual and/or real), one or more specific regions and/or locations in the geographical area, or the like, or a combination thereof.

Simulation module 605 may include software instructions for initiating a transportation simulation of the at least one scenario of ridesharing demand in the geographic area to simulate rides of the plurality of virtual vehicles transporting the virtual passengers along the roadway. For example, scenario module 604 may receive values of parameters relating to the scenario of ridesharing demand in the geographical area. By way of example, the scenario may be one in which there will be 200 ride requests (or passengers) occurring in the Woodstock area illustrated in FIG. 7 (i.e., geographical area 711) over a period of four hours. In some embodiments, simulation module 605 may provide the results of the transportation simulation. For example, simulation module 605 may present information and data relating the results in a user interface via I/O 350.

FIGS. 8A-8D illustrate exemplary user interfaces for presenting results of a transportation simulation. In this example simulation, there may be 200 ride requests over a simulation period of 4 hours in the Woodstock geographical area. As illustrated in FIGS. 8A-8D, user interface 800 may include three presentation regions: a map region 801, a statistics region 802, and a vehicle region 803. In some embodiments, user interface 800 may also include a time window representing the simulation period (e.g., the 4-hour time window illustrated in FIGS. 8A-8D) or portion thereof.

Evaluation module 606 may include software instructions for determining a performance level associated with the plurality of virtual vehicles, based on the transportation simulation. A performance level may include performance data relating to one or more ride requests, one or more ridesharing vehicles, one or more virtual rides, or the like, or a combination thereof. Evaluation module 606 may also include software instructions for providing an output representative of the determined performance level associated with the plurality of virtual vehicles. For example, as illustrated in FIG. 9, evaluation module 606 may provide a quality of service ("QoS") report representative of the determined performance level. The QoS report may include, for example, data of the total number of ride requests, the percentage of the completed rides, proposed ETA (mean), the walk distance to the pick-up location (mean), and the walk distance from the drop-off location (to the desired destination).

Recommendation module 607 may include software instructions for determining and outputting recommendations for improving the performance level. For example, recommendation module 607 may determine and output a recommendation for improving the performance level of the plurality of virtual vehicle by changing one or more values of the service parameters relating to ridesharing vehicles. By way of example, recommendation module 607 may recommend changing the number of ridesharing vehicles from 10 to 15 based on the results of the performance level showing that a fleet of 15 vans may be more effective and cheaper to maintain than a fleet of 10 buses.

Database interface module 608 may include software instructions executable to interact with database 609, to store and/or receive information (e.g., data relating to the geographical area, map information, information relating to ride requests and ridesharing vehicles, etc.). Database 609 may be configured to store any type of information associated with modules 601-607, depending on implementation-specific considerations.

Modules 601-608 may be implemented in software, hardware, firmware, or any combination of software, hardware or firmware. For example, if the modules are implemented in software, they may be stored in memory 250. However, in some embodiments, any one or more of modules 601-608 and data associated with database 609 may, for example, be stored in processor 204 and/or executed on a device associated with ridesharing management system 100. Modules 601-608 may be configured to interact with each other and/or other modules of memory 250 to perform functions consistent with disclosed embodiments.

Figure 10:
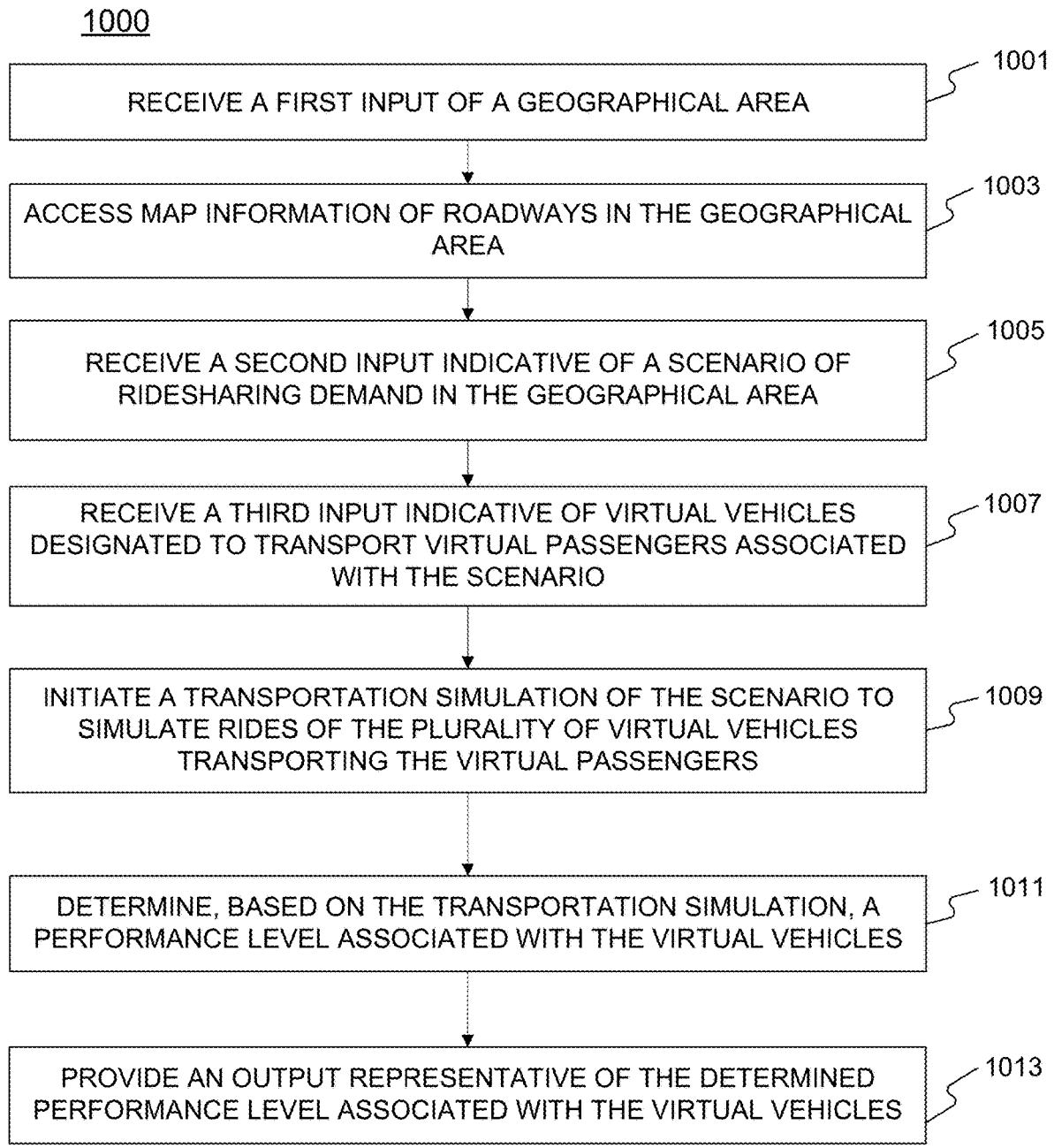
FIG. 10 is a flowchart of an exemplary process for determining a performance level associated with a plurality of vehicles, in accordance with some embodiments of the present disclosure.

FIG. 10 is a flowchart of an exemplary process 1000 for determining a performance level associated with a plurality of vehicles, in accordance with some embodiments of the present disclosure. In one embodiment, the steps of process 1000 may be performed by a vehicle management server, such as ridesharing management server 150 described above with reference to FIGS. 1 and 3. In the following description, reference is made to certain components of FIGS. 1-3 and FIG. 6 for purposes of illustration. It will be appreciated, however, that other implementations are possible and other components may be used to implement example methods disclosed herein.

At step 1001, a processor executing, for example, instructions of map module 603 may receive a first input of a geographical area. In some embodiments, the input received may include a country, a state, a province, a county, a city, a municipal district, or the like, or a combination thereof. The processor may determine a geographical area based on the received input. For example, the processor may receive an input from a user via I/O 350 indicating Woodstock in Cape Town, South Africa as the geographical area. The processor may determine the geographical area based on the received input. By way of example, the processor may determine the area of Woodstock as the geographical area (geographical area 711 as illustrated in FIG. 7).

Alternatively or additionally, the input received indicating a geographical area may include a location, and the processor may determine a geographical area based on the location and one or more predetermined distances. For example, the processor may receive from the user a location (e.g., a drop pin selected by the user on a digital map). The processor may also determine an area having the location as the center and a radius equal to a predetermined distance and designate the determined area as the geographical area. The area determined based on the location may be a disk, a square, a rectangle, a polygon, or the like, or a combination thereof.

Alternatively or additionally, the user may draw the geographical area on a digital map, which is received by the processor as the input indicating the geographical area. For example, as illustrated in FIG. 7, the user may select a plurality points on the digital map (e.g., the open circles in the grey boundary), and the processor may receive these points as the input. The processor may also determine the geographical area based on the selected points. By way of example, the processor may connect the points to form a geographical area. Alternatively or additionally, the processor may determine a plurality of road segments based on the selection points and determine a geographical area by connecting the road segments to form a geographical area. In some embodiments, the processor may also receive input from the user to adjust the geographical area.

At step 1003, a processor executing, for example, instructions of map module 603 may access map information of roadways in the geographical area. For example, the processor may receive map information of roadways in the geographical area from a database (e.g., database 609) or an external source (e.g., a digital map service provider). In some embodiments, the map information may include one or more indicators of driving velocity on the roadways in the geographical area. The driving velocity may include a driving velocity in real time (e.g., through the real-time traffic data) or a driving velocity based on historical data. For example, the processor may receive the driving velocity on a first roadway being around 20 km/hour and the driving velocity on a second roadway being around 40 40 km/hour in real time. Alternatively, the processor may determine an hour of the day and then obtain (or determine) an estimate driving velocity for one or more roadways in the geographical area.

Alternatively or additionally, the map information may include one or more indicators of traffic regulations associated with the roadways in the geographical area. For example, the processor may access an indicator of the speed limit for one or more roadways in the geographical area. In some embodiments, the traffic regulations may include speed limits, public transportation lanes, regulations specific to a specific type of vehicles (e.g., roads blocked to autonomous vehicles, charging lanes for electric vehicles, etc.), or the like, or a combination thereof.

At step 1005, a processor executing, for example, instructions of scenario module 604 may receive a second input indicative of at least one scenario of ridesharing demand in the geographical area. A scenario may include a plurality of service parameters. For example, a scenario may include service parameters relating to one or more passengers (virtual and/or real), one or more ride requests (virtual and/or real), one or more ridesharing vehicles (virtual and/or real), one or more specific regions and/or locations in the geographical area, or the like, or a combination thereof.

For example, in some embodiments, the processor may receive an input indicating the number of virtual passengers (or the number of virtual ride requests) being 200 for the scenario of ridesharing demand from the user (e.g., carets 750 illustrated in FIG. 7 representing virtual passengers). The input may also specify the time period over which the virtual passengers (or the virtual ride requests) spread. By way of example, the user may specify there will be 200 virtual passengers (or the number of virtual ride requests) over a period of two hours. In some embodiments, the user may specify in the input the number of virtual passengers (or the number of virtual ride requests) in a region in the geographical area. By way of example, as illustrated in FIG. 7, the user may specify in the input that there are 50 virtual passengers in region 741 and 100 virtual passengers in region 742 within a period of two hours. Alternatively or additionally, scenario module 604 may determine the number of virtual passengers (or virtual ride requests) in the geographical area (or one or more regions thereof) based on historical data. For example, scenario module 604 may determine there would be 300 ride requests in the geographical area in a period of two hours based on historical statistics of the ride requests around the same time point within the period of two hours.

In some embodiments, the second input may include an identification of a pick-up region in the geographical area and a drop-off region (e.g., a region around a drop-off location 731 illustrated in FIG. 7) in the geographical area. For example, the user may specify in the put a business area as a pick-up region and a residential area in the morning, and the business area as a pick-up region and the residential area as a drop-off region in the afternoon and/or evening. In some embodiments, the pick-up region may be a larger area than the drop-off region. Alternatively, the drop-off region may be a larger area than the pick-up region. Alternatively or additionally, the processor executing, for example, instructions of scenario module 604 may determine one or more pick-up regions and/or one or more drop-off regions based on the geographical area. For instance, the processor may determine a business area and a residential area in the geographical area. The processor may identify the business area as a drop-off region and the residential area as a pick-up region in the morning. The processor may also identify the business area as a pick-up region and the residential area as a drop-off region in the afternoon and/or evening.

In some embodiments, the processor may receive from the user (or determine) a location of at least one terminal for one or more ridesharing vehicles (real or virtual). For example, the processor may receive from a user an input for selecting points 721, 722, and 723 illustrated in FIG. 7 as the terminals for ridesharing vehicles. Alternatively or additionally, the processor may determine (or change) a terminal location for one or more ridesharing vehicles based on approved roads (e.g., one or more roads for which a ridesharing vehicle is allowed to park).

In some embodiments, the processor may receive from the user (or determine) locations for virtual stop locations for a ridesharing vehicle (e.g., a virtual bus stop) in the geographical area. The virtual bus stops may be accessible to pedestrian traffic and enable passenger pick-up. By way of example, a processor executing, for example, scenario module 604 (or other components of the vehicle management system) may use image processing to identify one or more virtual bus-stops in images (e.g., Google street view images).

In some embodiments, the processor may receive from the user (or determine) a starting point and a desired destination for at least one of the passengers (virtual or real). For example, the user may specify in the input a starting point and/or a desired destination for a virtual passenger. The processor may also determine a pick-up location and a drop-off location (e.g., a virtual bus stop) based on the starting point and the desired destination. The determined pick-up location may be a location other than but in proximity to the starting point, and the determined drop-off location may be a location other than but in proximity to the desired destination. Additionally or alternatively, the processor may determine the drop-off location of a passenger based on the status of a vehicle to be assigned to this passenger, the desired destination, and/or other factors. For example, in one embodiment, the desired destination may be a building at the corner of an intersection of two cross streets. The processor may determine that dropping the passenger off at the intersection would result in the vehicle entering a one-way street, impeding a more efficient route to a next destination. Thus, the processor may instead, for example, determine a drop-off location at a location proximal to the desired destination, and avoid entering the one-way street. In some embodiments, the processor may determine a drop-off location that is associated with a public transportation based on the desired destination. In some embodiments, the processor may determine a pick-up location within a predetermined distance from the starting point and a drop-off location within a predetermined distance from the desired destination. For example, the predetermined distance may be in a range of 1 to 5,000 meters. In some embodiments, a predetermined distance may be restricted in a subrange of 1-100 meters, 100-500 meters, 500-1,000 meters, or 1,000-5,000 meters.

At step 1007, a processor executing, for example, instructions of scenario module 604 may receive a third input indicative of a plurality of virtual vehicles designated to transport virtual passengers associated with the at least one scenario of ridesharing demand in the geographical area (or one or more sub-regions in the geographical area). For example, the processor may receive an input indicative of 100 virtual vehicles designated (or available) to transport the virtual passengers associated with the scenario determined at step 1005.

In some embodiments, the processor may receive the third input from a user. Alternatively or additionally, the processor may receive from other components of the vehicle management system (or determine) at least part of the third input. For example, the processor may determine a plurality of virtual vehicles based on historical data (e.g., the number of ridesharing vehicles available around the same time in the same period of time).

In some embodiments, the third input may include at least one of the number of the plurality of virtual vehicles designated (or available) to transport the virtual passengers, the capacity for the plurality of virtual vehicles designated to transport the virtual passengers, and the type of the plurality of virtual vehicles designated to transport the virtual passengers. In some embodiments, the processor may determine information relating to a plurality of virtual vehicles designated to transport virtual passengers associated with the at least one scenario of ridesharing demand in the geographical area.

In some embodiments, the capacity for the virtual vehicles may be in a range of 1-100 passengers. In some embodiments, the capacity may be restricted in subranges of 1-5, 5-10, 10-50, or 50-100. The type of the virtual vehicles may include an autonomous vehicle, a manually-drivable vehicle, an electrically-powered vehicle, a petrol-powered vehicle, a hybrid-powered vehicle, a fixed-line vehicle (i.e., driving on one or more fixed routes), an on-demand vehicle (i.e., at least part of the driving route is not fixed), or the like, or a combination thereof.

In some embodiments, the third input may include identification of at least one of the plurality of virtual vehicles as a fixed-line vehicle and a route of the fixed-line vehicle. In some embodiments, the third input may also include a plurality of fixed-line vehicles that at least some of them associated with a same route. Alternatively or additionally, the third input may include identification of some of the plurality of virtual vehicles as fixed-line vehicles and others of the plurality of virtual vehicles as on-demand vehicles.

Alternatively or additionally, the third input may include identification of at least some of the plurality of virtual vehicles as being part of a fixed-line service. For example, the processor may also receive information indicative of past demand of actual passengers of the fixed-line service. For example, the processor may receive the information based on big data mining from electronic tickets records (e.g., the departure location and time, the arrival location and time, etc.) via from database 609 via Database interface module 608 or from an external source via communication module 601.

In some embodiments, the processor may present real time statistics of a transportation service provided to the plurality of users. The processor may also display a map presenting locations of each of the plurality of vehicles at a particular time period. The processor may further display an indicator for each of the plurality of vehicles on the map identifying each vehicle as an on-demand vehicle or as a fixed-line vehicle.

At step 1009, a processor executing, for example, instructions of simulation module 605 may initiate a transportation simulation of the at least one scenario of ridesharing demand in the geographic area to simulate rides of the plurality of virtual vehicles transporting the virtual passengers along the roadway.

For example, the processor may receive, from scenario module 604 and map module 603, values of parameters relating to the scenario of ridesharing demand (as described elsewhere in this disclosure in connection with step 1005) in a geographical area (as described elsewhere in this disclosure in connection with step 1001). By way of example, the scenario may be one in which there will be 200 ride requests (or passengers) occurring in the Woodstock area illustrated in FIG. 7 (i.e., geographical area 711) over a period of four hours. The parameters relating to a scenario may include one or more passengers (virtual and/or real), one or more ride requests (virtual and/or real), one or more ridesharing vehicles (virtual and/or real), one or more specific regions and/or locations in the geographical area (e.g., one or more pick-up regions, one or more drop-off regions, etc.), or the like, or a combination thereof. The processor may also obtain the map information from map module 603. The detail of the map information is described elsewhere in this disclosure (e.g., in connection with step 1003), of which is not repeated here. The processor may further receive the information and/or parameter values relating to the plurality of virtual ridesharing vehicles by accessing database 609 and/or based on instructions executed by, for example, scenario module 604. The information and/or parameter values relating to the plurality of virtual ridesharing vehicle are described elsewhere in this disclosure (e.g., in connection with step 1007). The processor may initiate and run a transportation simulation based on the parameter values and/or information relating to the scenario, ridesharing vehicles, and map information. By way of example the processor may obtain the ride requests at a time point of the simulation period. The processor may virtually assign the ridesharing vehicles available to the ride requests and determine the driving route for each of the assigned ridesharing vehicles. The processor may also determine and record the virtual positions (and/or the virtual ride) for each of the ridesharing vehicles on roadways over the period of the transportation simulation (e.g., 4 hours) or portion thereof (e.g., 2 hours). The processor may further determine and record the information relating to the virtual rides, ridesharing vehicles, ride requests, and/or passengers. The information may include the time information relating to each of the virtual rides (e.g., the time of a ride request being initiated, processed, assigned to a ridesharing vehicle, the pick-up time, the drop-off time, etc.). Alternatively or additionally, the information may also include the number of valid requests and/or invalid requests, the percentage of the ride requests being served (or having been assigned to a ridesharing vehicle), the ETA and/or actual time of arrival for each of the virtual rides. Alternatively or additionally, the information may include the walking distance for each of the passenger to the pickup location and/or the drop-off location (e.g., a virtual bus stop).

In some embodiments, the processor may spread the ride requests over the period of the simulation (e.g., 4 hours). For example, the processor may randomly assign the ride requests (or portion thereof) over the simulation period (or portion thereof). Alternatively or additionally, the processor may determine the time points for the ride requests based on real-time data or historical data. For instance, the period of a simulation may start from 7 a.m. and end at 11 a.m. The processor may obtain the number of ride requests reflecting the actual demand throughout the 4-hour window (or portion thereof). Alternatively or additionally, simulation module 605 may obtain the number of ride requests reflecting the historical demand over the 4-hour window (or portion thereof). In some embodiments, the processor may also determine, for at least one of the ride requests, a pick-up location based on the corresponding starting point and/or a drop-off location (e.g., a virtual bus stop) based on the corresponding desired destination. The processor may further determine the distance between the pick-up location and the corresponding starting point and the distance between the drop-off location and the corresponding desired destination.

In some embodiments, a scenario may include at least some of the plurality of virtual ridesharing vehicles being fixed-line vehicles and some of the plurality of virtual vehicles as on-demand vehicles. For example, the processor may determine at least one simulated ride including multi-leg journeys in which one segment is provided by a fixed-line vehicle and another segment is provided by an on-demand vehicle.

In some embodiments, the processor may receive (or determine) additional parameters for a transportation simulation of the scenario. Simulation module 605 may receive (or determine) one or more parameters (in addition to the parameters and information received or determined at steps 1001-1007) relating to one or more simulated rides of a virtual vehicle. For example, the processor 5 may receive one or more factors relating to one or more drivers (virtual or real) and initiate (or run) the transportation simulation based at least in part on the factor(s). By way of example, the processor may receive some restrictions relating to one or more drivers, including, for instance, the hours that a driver is allowed to drive continuously, shift hours. The processor may take these restrictions into consideration when initiating a transportation simulation. Alternatively or additionally, the processor may receive the restrictions on generating a ride request and/or simulated ride, and generate one or more ride requests and/or simulated rides that do not violate these restrictions. For example, the processor may receive a restriction on the maximum walk distance between a pick-up location and the corresponding starting point (and/or between a drop-off location and the desired destination) being less than 1 km. The ride request(s) determined by the processor may not violate such restrictions. As another example, the processor may receive a restriction on the maximum estimated arrival of time (ETA) and determine simulated rides having an ETA less than the maximum ETA. As another example, the processor may receive a restriction on the maximum detour (e.g., detour distance and/or detour time) and determine simulated rides having no detour or a detour less than the maximum detour.

In some embodiments, the processor may provide the results of the transportation simulation. For example, the processor may present information and data relating the results in a user interface via I/O 350. FIGS. 8A-8D illustrate exemplary user interfaces for presenting some results of a transportation simulation. In this example simulation, there may be 200 ride requests over a simulation period of 4 hours in the Woodstock geographical area. Additionally, there may be five ridesharing vehicles to be assigned to the ride requests. As illustrated in FIGS. 8A-8D, user interface 800 may include three presentation regions: a map region 801, a statistics region 802, and a vehicle region 803. In some embodiments, user interface 800 may also include a time window representing the simulation period (e.g., the 4-hour time window illustrated in FIGS. 8A-8D) or portion thereof.

Map region 801 may display a digital map including the geographical area or portion thereof. In some embodiments, map region 801 may also display icons (or other visual representation) representing positions of the passengers (virtual or real) who initiate the ride requests and the ridesharing vehicles. Alternatively or additionally, map region 801 may display information relating to the ride requests. For example, map region 801 may display icons (or other visual representation) representing pick-up locations and/or drop-off locations and corresponding starting points and/or desired destinations. Alternatively or additionally, map region 801 may display icons (or other visual representation) representing the locations of each of the plurality of virtual vehicles during the transportation simulation. Map region 801 may further display the trace of a ridesharing vehicle for each of the virtual rides it takes. In some embodiments, map region 801 may present real-time statistics of a transportation service provided to the plurality of users. Alternatively or additionally, map region 801 may present locations of each of the plurality of vehicles at a particular time period and display an indicator for each of the plurality of vehicles on the map identifying each vehicle as an on-demand vehicle or as a fixed-line vehicle.

Figure 8A:
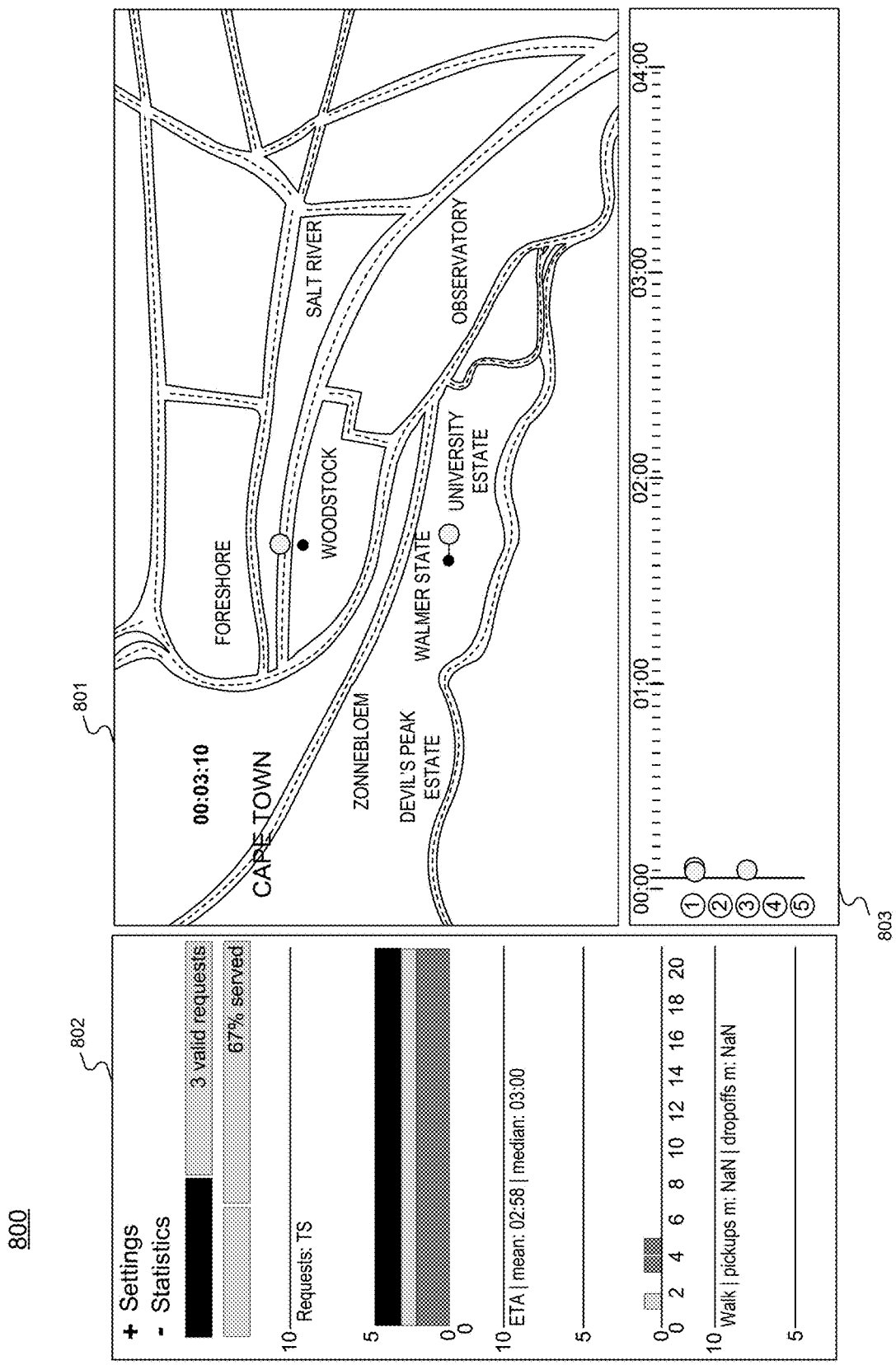
FIGS. 8A-8D are diagrams illustrating example user interfaces showing an exemplary simulation of vehicle ridesharing, in accordance with some embodiments of the present disclosure.
Figure 8B:
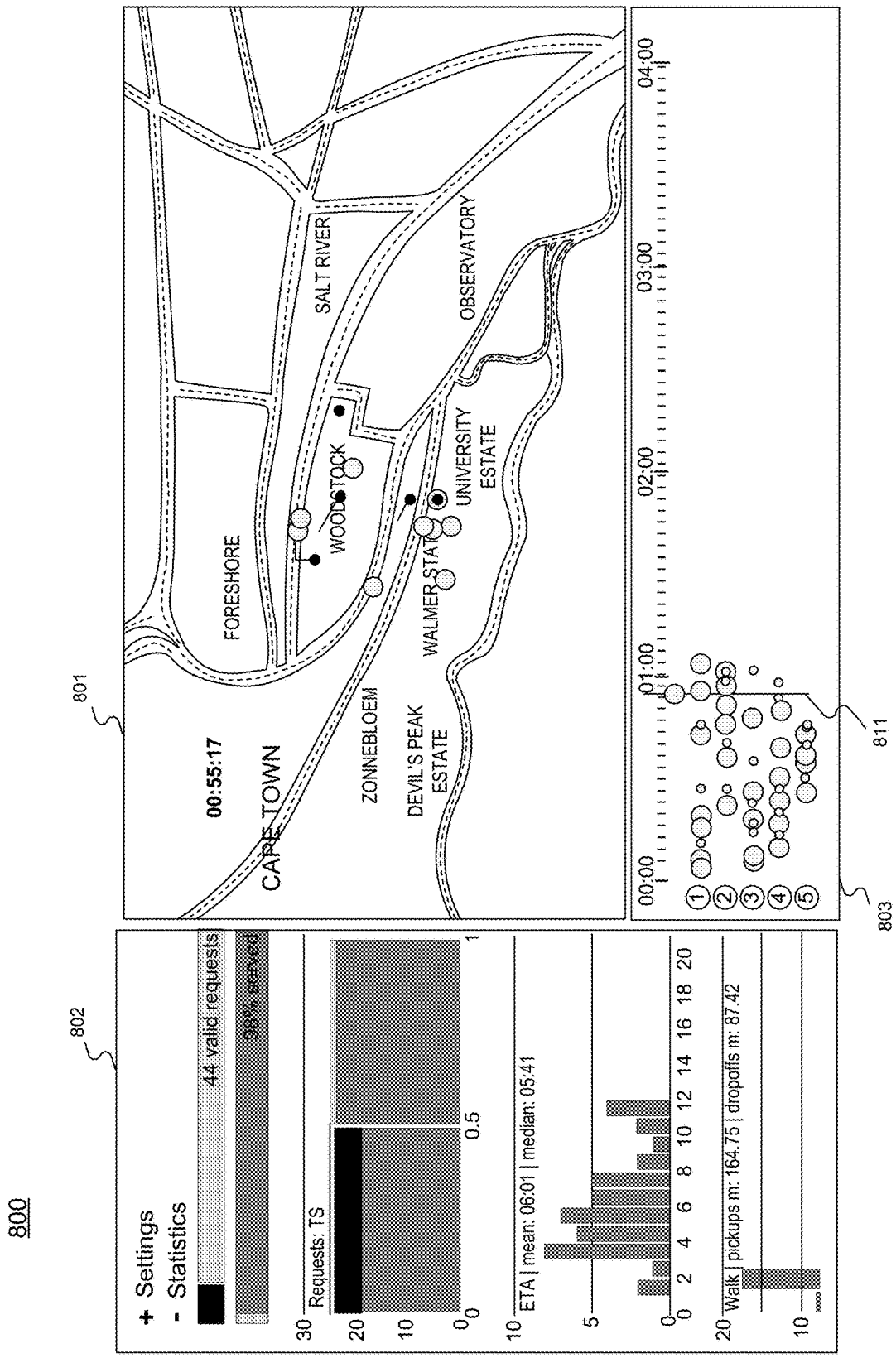
Figure 8C:
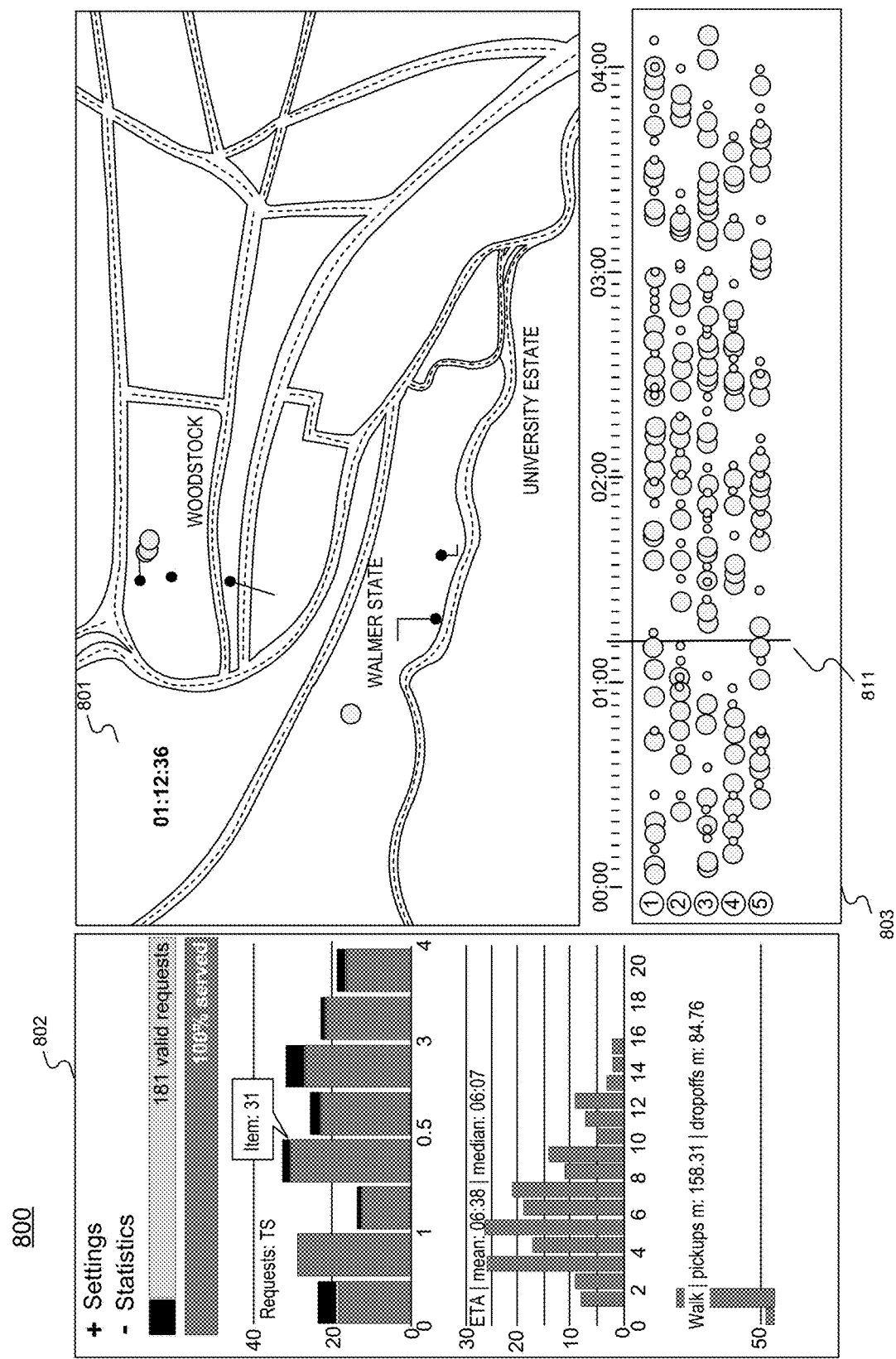

Statistics region 802 may display the statistics data of the results of the transportation simulation. For example, statistics region 802 may display statistics of a transportation service provided to the virtual passengers. The data displayed may include the statistics of the transportation simulation at the moment (i.e., in real time) or over the whole period of the simulation. For example, FIGS. 8A-8C illustrate snapshots of the transportation simulation (around 3 minutes, 55 minutes, and 72 minutes into the transportation simulation, respectively). For instance, statistics region 802 of FIG. 8A may display the statistics data at the 3-minute mark (e.g., 3 valid requests, 67% of the requests being served, etc.). As another example, statistics region 802 of FIG. 8B may display the statistics data at a later time (e.g., 44 valid requests, 98% of the requests being served, etc.). The statistics data may include data relating to the ride requests, ridesharing vehicles, virtual rides, or the like, or a combination thereof. The data relating to the ride requests may include the number of ride requests, the number of valid ride requests, the number of the ride requests that have been served, the number of the ride requests that have been assigned to a ridesharing vehicle, or the like, or a combination thereof. The data relating to ridesharing vehicles may include the number of the ridesharing vehicles available to dispatch, the number of the ridesharing vehicles that are en route for a virtual ride, the hours of the ridesharing vehicles being running, the capacity of the ridesharing vehicles, or the like, or a combination thereof. The data relating to virtual rides may include the estimated time of arrival (ETA) and actual time of arrival for each of the virtual rides and/or the statistics of ETAs and actual time of arrival time (e.g., the mean ETA and/or actual times of arrival, the median value of ETA and/or actual times of arrival, etc.).

Figure 8D:
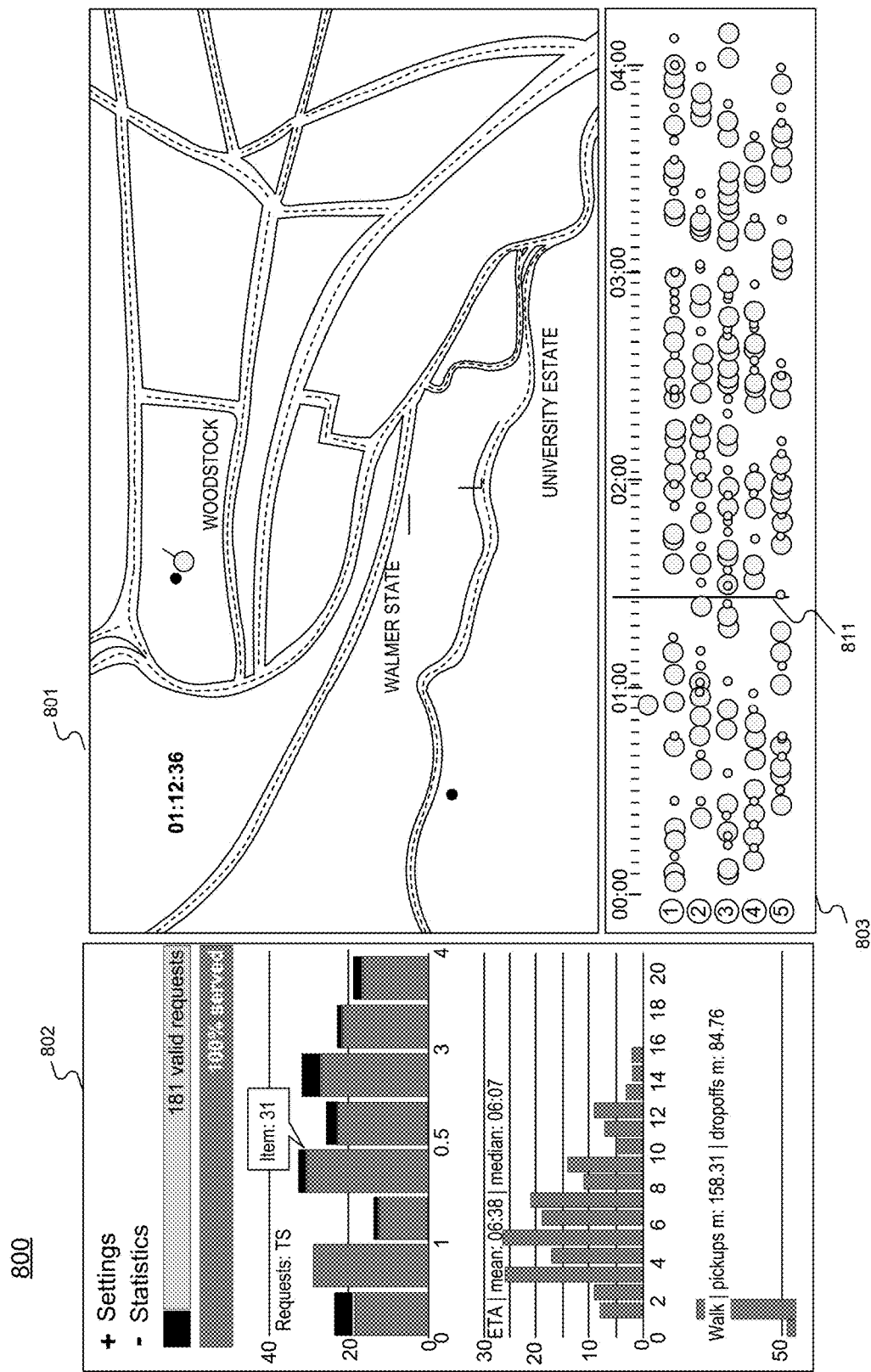

Vehicle region 803 may display information relating to one or more ridesharing vehicles. For example, vehicle region 803 may display a timeline of the transportation simulation for each of the plurality of virtual vehicles. The timeline may show when a virtual vehicle transported at least one virtual passenger. By way of example, vehicle region 803 of FIG. 8C illustrates a timeline for each of the five ridesharing vehicles, along with a time window (i.e., the 4-hour window). A timeline for a ridesharing vehicle may include time information relating to time points for picking up a passenger and/or dropping off a passenger, the periods of virtual rides, idle periods (i.e., blank periods in the timeline), or the like, or a combination thereof. In some embodiments, user interface 800 may include a time indicator indicating the time point of the transportation simulation that is presented. For example, as illustrated in FIG. 8D (and FIGS. 8A-8C), user interface 800 may include a line 811 indicating the time point (i.e., about 1 hour and 12 minutes) during a duration of the transportation simulation. In some embodiments, the user may interact with the timeline of the transportation simulation by, for example, dragging line 811 to a desired time point during a duration of a simulation. The information and/or data presented in user interface 800 may also be updated according to the updated time point based on the user's input.

At step 1011, a processor executing, for example, instructions of evaluation module 606 may determine a performance level associated with the plurality of virtual vehicles, based on the transportation simulation. A performance level may include performance data relating to one or more ride requests, one or more ridesharing vehicles, one or more virtual rides, or the like, or a combination thereof. Exemplary performance data relating to ride requests may include the total number of the ride requests received (or generated), the number of the ride requests that are not been served, the percentage of the ride requests (or valid ride requests) that have been served, the proposed ETA (mean or median), the walk distance to the pick-up location and/or the drop-off location (e.g., total, mean, and/or median for each of the ride requests or total ride requests). Exemplary performance data relating to ridesharing vehicles may include the driving time periods and/or idle time periods for each and/or all of the ridesharing vehicles. Exemplary performance data relating to virtual rides may include the actual times of arrival (mean or median), the difference between the proposed ETA and the corresponding actual time of arrival (mean or median).

At step 1013, the processor may provide an output representative of the determined performance level associated with the plurality of virtual vehicles. For example, as illustrated in FIG. 9, evaluation module 606 may provide a quality of service ("QoS") report representative of the determined performance level. The QoS report may include data of the total number of ride requests, the percentage of the completed rides, proposed ETA (mean), the walk distance to the pick-up location (mean), and the walk distance from the drop-off location (to the desired destination).

In some embodiments, the processor executing, for example, instructions of recommendation module 607 may determine and output a recommendation for improving the performance level. For example, the processor may determine and output a recommendation for improving the performance level of the plurality of virtual vehicle by changing at least one of: the number of the plurality of virtual vehicles designated to transport the virtual passengers, the capacity for the plurality of virtual vehicles designated to transport the virtual passengers, and the type of the plurality of virtual vehicles designated to transport the virtual passengers. By way of example, the processor may recommend changing the number of ridesharing vehicles from 10 to 15 based on the results of the performance level showing that a fleet of 15 vans may be more effective and cheaper to maintain than a fleet of 10 buses. Alternatively or additionally, the third input may include identification of at least some of the plurality of virtual vehicles as being part of a fixed-line service, and the processor may determine and output a recommendation for improving the performance level of at least one of the plurality of virtual vehicles by changing at least one route associated with the fixed-line service. Alternatively or additionally, the processor may determine and output a recommendation for improving the performance level of at least one of the plurality of virtual vehicles by changing at least one pick-up location associated with the fixed-line service. Alternatively or additionally, the processor may determine and output a recommendation for improving the performance level of at least one of the plurality of virtual vehicles by changing a schedule associated with the fixed-line service. Alternatively or additionally, the processor may determine and output a recommendation for improving the performance level of at least one of the plurality of virtual vehicles by changing a ratio between a number of fixed-line vehicles and a number of on-demand vehicles, including, for example, adding another new on-demand vehicle, adding another fixed-line vehicle, telling one of the on-demand vehicle to take a break, telling one of the fixed-line vehicle to take a break, telling a fixed-line vehicle to start being on-demand, and telling an on-demand vehicle to start being fixed-line. By way of example, when a first sub-plurality of ridesharing vehicles are assigned to provide fixed-line service and a second sub-plurality of ridesharing are assigned to provide on-demand service, the processor may provide a recommendation to change a ratio between the first sub-plurality of ridesharing vehicles and the second sub-plurality of ridesharing, based on the results of the transportation simulation(s). By way of example, the processor may provide a recommendation time-based for a specific vehicle to run a fix-line in a first period (e.g., between 6-9 a.m.) and run on-demand services in a second period (e.g., between 9 a.m. to 12 p.m.). Alternatively or additionally, the processor may determine and output a recommendation for modifying service hours for one or more of the plurality of virtual vehicles. For example, the processor may recommend how many vehicles should start at 06:00 a.m. and how many at 07:00 a.m., when is the best time to give drivers breaks, or the like, or a combination thereof. Alternatively or additionally, the processor may determine and output a recommendation for improving the performance level of at least one of the plurality of virtual vehicles by identifying at least one of the roadways for modification to include a public transportation lane. For example, the identification may include specific hours and may be based on real traffic data. Alternatively or additionally, the identification may include roads (and/or lanes) that are open to autonomous vehicles. Alternatively or additionally, scenario module 604 may receive an additional input selection including details of one or more passenger-service parameters, and the processor may determine and output a recommendation for improving the performance level of at least one of the plurality of virtual vehicles by changing one or more passenger service parameters, including, for example, changing a maximum walking distance from a starting location to a pick-up location or from a drop-off location to a desired destination, a maximum route detour, a maximum waiting time, or the like, or a combination thereof. The change of passenger service parameters may be associated with all the scenarios of ridesharing demand or portion thereof. Alternatively or additionally, when the processor identifies in the transportation simulation at least one virtual passenger that the plurality of virtual vehicles failed to pick-up, the processor 607 may determine and output a recommendation for improving the performance level of at least one of the plurality of virtual vehicles to enable picking up of all virtual passengers. For example, the processor may provide a recommendation to change one or more passenger service parameters (as described above) and/or parameters relating to ridesharing vehicles (e.g., the number of the vehicles designated (or available), the capacity for the vehicles, and the type of the vehicles) to enable picking up of all virtual passengers.

In some embodiments, prior to a recommendation being provided, the processor may initiate at least one additional transportation simulation to confirm that the recommendation improves the performance level of the plurality of virtual vehicles. For example, the processor executing, for example, instructions of simulation module 605 (and/or scenario module 604) may set parameters consistent with a preliminary recommendation and initiate a second simulation. The processor may determine the performance level of the second simulation. If the preliminary recommendation improves the performance level of the plurality of virtual vehicles, the processor may cause transmission of the preliminary recommendation as the recommendation to the user. If the preliminary recommendation does not improve the performance level (e.g., the preliminary recommendation does not lead to an intended improvement of the performance level), the system may further optimize the recommendation prior to causing transmission of the recommendation to the user. For example, the processor may provide one or more additional preliminary recommendations. The processor may run one or more additionally simulations, and the processor may evaluate the performance level for the simulation(s) accordingly. The processor may design a preliminary recommendation for which the simulation improves as the recommendation provided to the user.

In some embodiments, the processor may run a plurality of simulations, and determine a recommendation based on the results of the simulations. For example, the processor may determine a recommendation including an identification of suggested bus stops after running multiple simulations and optimize the results. Alternatively or additionally, the processor may determine a recommendation including an identification of suggested routes after running multiple simulations and optimize the results. Alternatively or additionally, the processor may determine a recommendation including an identification of departures times and/or line frequency after running multiple simulations and optimize the results.

Figure 11:
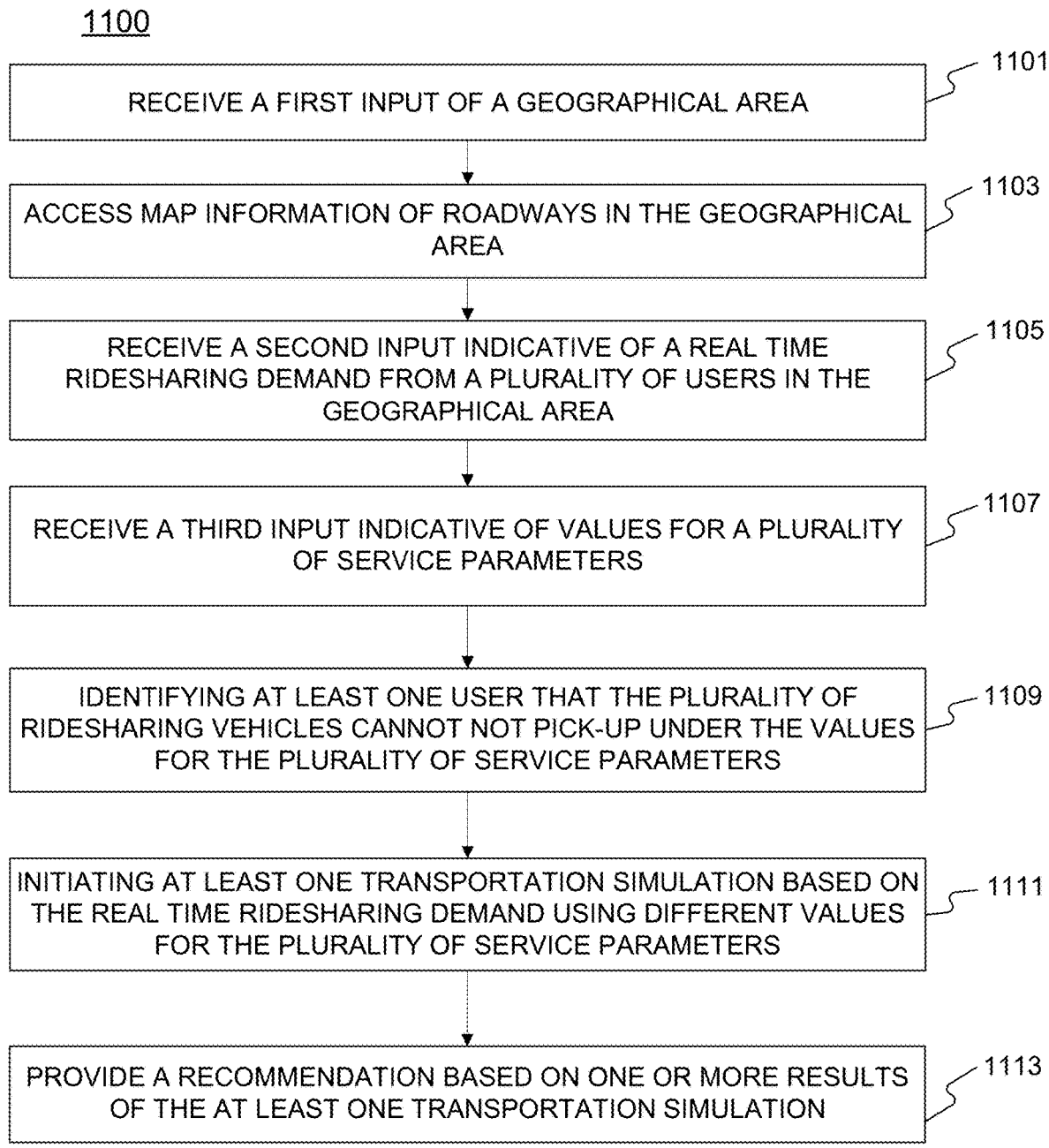
FIG. 11 is a flowchart of an exemplary process for initiating a transportation simulation.

FIG. 11 is a flowchart of an exemplary process 1100 for initiating a transportation simulation and determining a recommendation based on the result of the transportation simulation, in accordance with some embodiments of the present disclosure. In one embodiment, the steps of process 1100 may be performed by a vehicle management server, such as ridesharing management server 150 described above with reference to FIGS. 1 and 3. In the following description, reference is made to certain components of FIGS. 1-3 and FIG. 6 for purposes of illustration. It will be appreciated, however, that other implementations are possible and other components may be utilized to implement example methods disclosed herein.

At step 1101, a processor executing, for example, instructions map of module 603 may receive a first input of a geographical area. For example, the processor may receive an input from a user for selecting a portion of a digital map as a geographical area. In some embodiments, the input received by the processor may be similar to the input received at step 1001 of process 1000 described above, the details of which are not repeated herein.

At step 1103, the processor may access map information of roadways in the geographical area. For example, the processor may receive map information of roadways in the geographical area from a database (e.g., database 609) or an external source (e.g., a digital map service provider). In some embodiments, the map information of roadways in the geographical area accessed by the processor may be similar to the map information received at step 1003 of process 1000 described above, the details of which are not repeated herein.

At step 1105, a processor executing, for example, instructions of scenario module 604 may receive a second input indicative of a real-time ridesharing demand from a plurality of users in the geographical area. For example, the processor may receive a plurality of real-time ride requests from a plurality of users in the geographical area via, for example, communication module 601. The processor may receive an input indicative of the real-time ridesharing demand based on the real-time ride requests. Detailed descriptions of a ride request is provided elsewhere in this disclosure and is not repeated herein.

In some embodiments, the processor may present real-time statistics of a transportation service provided to the plurality of users. The processor may also display a map presenting locations of each of the plurality of vehicles at a particular time period. The processor may further display an indicator for each of the plurality of vehicles on the map identifying each vehicle as an on-demand vehicle or as a fixed-line vehicle.

At step 1107, a processor executing, for example, instructions of scenario module 604 may receive a third input indicative of values for a plurality of service parameters. For example, the service parameters may include vehicle-related parameters, which may include, for example, the number of vehicles assigned to transport the plurality of users, the capacity of each of the vehicles assigned to transport the users (e.g., the number of passengers that a vehicle can transport at a given time), and the type of each of the vehicles assigned to transport the users. Alternatively or additionally, the service parameters may include passenger-related parameters, which may include, for example, a maximum walking distance from a starting location of a user to a pick-up location, a maximum walking distance from a drop-off location to a desired destination of a user, a maximum route detour, a maximum waiting time, or the like, or a combination thereof. In some embodiments, the service parameters may also include parameters relating to one or more virtual passengers (or ride requests), one or more specific regions and/or locations in the geographical area, or the like, or a combination thereof. For example, the service parameters may include one or more virtual ride requests added to the real-time ride requests and/or one or more virtual ridesharing vehicles added to the real ridesharing vehicles currently available to be assigned to transport passengers. In some embodiments, the service parameters are similar to the service parameters described in connection with step 1005 of process 1000, the description of which is not repeated herein.

At step 1109, a processor executing, for example, instructions of evaluation module 606 may identify at least one user that the plurality of ridesharing vehicles cannot pick-up under the values for the plurality of service parameters. For example, the processor may initiate a transportation simulation using the values for the plurality of service parameters. In some embodiments, the processor may initiate the transportation simulation based on a step similar to step 1009 of process 1000, the description of which is not repeated herein. The processor may execute, for example, instructions of evaluation module 606 to evaluate the performance level of the service parameters based on the results of the transportation simulation. In some embodiments, the processor may evaluate the performance level of the service parameters based on the results of the transportation simulation according to a step similar to step of 1011 of process 1000 described above, the description of which is not repeated herein. The processor may also determine whether all the passengers have been and/or are to be picked up. If not, the processor 6 may further identify any passenger who the ridesharing vehicles cannot pick up. In some embodiments, the processor may also provide an output representative of the determined performance level associated with the service parameters. For example, the processor may provide an output representative of the identified passenger(s) who the ridesharing vehicles cannot pick up with the values of the service parameters.

In some embodiments, a processor executing, for example, instructions of recommendation module 607 may also provide a preliminary recommendation to adjust at least one of the values for the service parameters. In some embodiments, the processor may provide the preliminary recommendation based on a step similar to step 1013 of process 1000 described above, the description of which is not repeated herein.

At step 1111, a processor executing, for example, instructions of simulation module 605 may initiate at least one transportation simulation based on the real-time ridesharing demand using one or more different values for one or more of the service parameters. The different value(s) may be of one or more parameters relating to ridesharing vehicles, including, for example, the number of vehicles assigned to transport the plurality of users, the capacity of the vehicles assigned to transport the users (e.g., the number of passengers that a vehicle can transport at a given time), the type of the vehicles assigned to transport the users, or the like, or a combination thereof. Alternatively or additionally, the different value(s) may be of one or more parameters relate to parameters relating to passengers, including, for example, a maximum walking distance from a starting location of a user to a pick-up location, a maximum walking distance from a drop-off location to a desired destination of a user, a maximum route detour, a maximum waiting time, or the like, or a combination thereof. In some embodiments, the different value(s) may be recommended based on the results of one or more prior transportation simulations.

At step 1113, a processor executing, for example, instructions of recommendation module 607 may provide a recommendation based on one or more results of the at least one transportation simulation. In some embodiments, the processor may provide a recommendation for improving the performance level according to a step similar to step 1013 of process 1000 described above, the description of which is not repeated herein. For example, when a first sub-plurality of ridesharing vehicles are assigned to provide fixed-line service and a second sub-plurality of ridesharing are assigned to provide on-demand service, recommendation module 607 may provide a recommendation to change a ratio between the first sub-plurality of ridesharing vehicles and the second sub-plurality of ridesharing, based on the results of the transportation simulation(s). By way of example, the processor may provide a recommendation time-based for a specific vehicle to run a fix-line in a first period (e.g., between 6-9 a.m.) and run on-demand services in a second period (e.g., between 9 a.m. to 12 p.m.).

In some embodiments, the system and method described in connection with process 1000 and/or process 1100 in this disclosure may also be applied to the fields of logistics and/or package (or mail) delivery. For example, the system may initiate a simulation to deliver packages (which may correspond to passengers) using a plurality of delivery vehicles (which may correspond to ridesharing vehicles), according to a delivery scenario (or values for a plurality of service parameters). The delivery scenario may be real (e.g., the delivery requests in real time) or simulated (e.g., based on the input from a user). The delivery request for delivering a package may correspond to a ride request, and the package to be delivered may correspond to a passenger. Additionally, the delivery request may include a starting point and a desired destination, which may correspond to the starting point and the desired destination of a ride request. The system may determine a pick-up location and/or drop-off location for the delivery request (similar to those for a ride request). In operation, the system may receive a first input of a geographical area and access map information of roadways in the geographical area (similar to steps 1001 and 1003 of process 1000 and/or steps 1101 and 1103 of 1100 described above). The system may also receive a second input indicative of at least one scenario of logistics and/or package (or mail) delivery demand in the geographical area (similar to step 1005 of process 1000 and/or step 1105 of 1100 described above). The system may further receive a third input indicative of a plurality of virtual and/or real vehicles designated to transport virtual passengers associated with the scenario in the geographical area (similar to step 1007 of process 1000 described above). Alternatively or additionally, the system may receive a third input indicative of values for a plurality of service parameters (similar to step 1107 of process 1100 described above). The system may further initiate a transportation simulation of the scenario of ridesharing demand in the geographic area to simulate logistics and/or package (or mail) delivery (similar to step of 1009 of process 1000 and/or step 1111 of 1100 described above). The system may also determine a performance level associated with the virtual and/or real vehicles, based on the simulation (similar to step of 1011 of process 1000 described above), and provide an output representative of the determined performance level (similar to step of 1013 of process 1000). The system may further determine and output a recommendation for improving the performance level (similar to step of 1013 of process 1000 and/or step 1113 of 1100 described above). In some embodiments, the system may identify one or more packages and/or passengers that the vehicles cannot pick up (similar to step 1109 of process 1100 described above).

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer-readable media, such as secondary storage devices, e.g., hard disks or CD ROM, or other forms of RAM or ROM, USB media, DVD, Blu-ray, Ultra HD Blu-ray, or other optical drive media.

Computer programs based on the written description and disclosed methods are within the skills of an experienced developer. The various programs or program modules can be created using any of the techniques known to one skilled in the art or can be designed in connection with existing software. For example, program sections or program modules can be designed in or by means of Net Framework, Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method for simulating vehicle ridesharing, the the method comprising: receiving a first input of a geographical area; accessing map information of roadways in the geographical area; receiving a second input indicative of at least one scenario of ridesharing demand in the geographical area; receiving a third input indicative of a plurality of virtual vehicles designated to transport virtual passengers associated with the at least one scenario of ridesharing demand in the geographical area; initiating a transportation simulation of the at least one scenario of ridesharing demand in the geographic area to simulate rides of the plurality of virtual vehicles transporting the virtual passengers along the roadways; determining, based on the transportation simulation, a performance level associated with the plurality of virtual vehicles; and providing an output representative of the determined performance level associated with the plurality of virtual vehicles and a recommendation for improving the performance level by changing a number of the plurality of virtual vehicles designated to transport the virtual passengers.

2. The method of claim 1, wherein the map information includes one or more indicators of driving velocity on the roadways in the geographical area.

3. The method of claim 1, wherein the map information includes one or more indicators of traffic regulations associated with the roadways in the geographical area.

4. The method of claim 1, wherein the second input includes an identification of a pick-up region in the geographical area and a drop-off region in the geographical area, wherein the pick-up region is a larger area than the drop-off region.

5. The method of claim 1, wherein the second input selection includes an identification of a pick-up region in the geographical area and a drop-off region in the geographical area, wherein the drop-off region is a larger area than the pick-up region.

6. The method of claim 1, wherein the second input includes an indication of a number of virtual passengers for the at least one scenario of ridesharing demand.

7. The method of claim 1, wherein the third input includes a number of the plurality of virtual vehicles designated to transport the virtual passengers, a capacity for the plurality of virtual vehicles designated to transport the virtual passengers, a type of the plurality of virtual vehicles designated to transport the virtual passengers, or any combination thereof.

8. The method of claim 7, wherein outputting a recommendation for improving the performance level of the plurality of virtual vehicles further comprises changing the capacity for the plurality of virtual vehicles designated to transport the virtual passengers, the type of the plurality of virtual vehicles designated to transport the virtual passengers, or any combination thereof.

9. The method of claim 1, wherein the third input includes identification of at least one of the plurality of virtual vehicles as a fixed-line vehicle and a route of the fixed-line vehicle.

10. The method of claim 1, wherein the third input includes identification of at least some of the plurality of virtual vehicles as being part of a fixed-line service and the method further comprises receiving information indicative of past demand of actual passengers of the fixed-line service.

11. The method of claim 1, wherein the third input includes identification of at least some of the plurality of virtual vehicles as being part of a fixed-line service, and the method further comprises outputting a recommendation for improving the performance level of at least one of the plurality of virtual vehicles by changing at least one route associated with the fixed-line service.

12. The method of claim 1, wherein the third input includes identification of at least some of the plurality of virtual vehicles as being part of a fixed-line service, and the method further comprises outputting a recommendation for improving the performance level of at least one of the plurality of virtual vehicles by changing at least one pick-up location associated with the fixed-line service.

13. The method of claim 1, wherein the third input includes identification of at least some of the plurality of virtual vehicles as being part of a fixed-line service, and the method further comprises outputting a recommendation for improving the performance level of at least one of the plurality of virtual vehicles by changing a schedule associated with the fixed-line service.

14. The method of claim 1, wherein the third input includes identification of some of the plurality of virtual vehicles as fixed-line vehicles and others of the plurality of virtual vehicles as on-demand vehicles.

15. The method of claim 14, wherein the method further comprises outputting a recommendation for improving the performance level of the plurality of virtual vehicles by changing a ratio between a number of fixed-line vehicles, a number of on-demand vehicles, or any combination thereof.

16. The method of claim 1, wherein the method further comprises outputting a recommendation for modifying service hours for one or more of the plurality of virtual vehicles.

17. The method of claim 1, wherein the method further comprises outputting a recommendation for improving the performance level of at least one of the plurality of virtual vehicles by identifying at least one of the roadways for modification to include a public transportation lane.

18. The method of claim 1, wherein the method further comprises receiving a location of at least one terminal for the plurality of virtual vehicles.

19. The method of claim 1, wherein the method further comprises identifying locations for virtual bus stops in the geographical area, wherein the virtual bus stops are accessible to pedestrian traffic and enable passenger pick-up.

20. The method of claim 1, wherein the method further comprises determining a starting point and a desired destination for at least one of the virtual passengers, wherein the transportation simulation may include determining at least one pick-up location for the at least one virtual passenger distant from a corresponding starting point.

21. The method of claim 1, wherein the method further comprises receiving an additional input selection including details of one or more passenger-service parameters; and presenting a recommendation for improving the performance level of at least one of the plurality of virtual vehicles by changing the one or more passenger service parameters.

22. The method of claim 1, wherein the method further comprises identifying in the transportation simulation at least one virtual passenger that the plurality of virtual vehicles failed to pick-up; and provide a recommendation to enable picking up the at least one virtual passenger.

23. The method of claim 1, wherein the method further comprises prior to providing a recommendation, initiating at least one additional transportation simulation to confirm that the recommendation improves the performance level of the plurality of virtual vehicles.

24. The method of claim 1, wherein the method further comprises displaying a timeline of the transportation simulation for each of the plurality of virtual vehicles, wherein the timeline shows when a virtual vehicle transported at least one virtual passenger; displaying a map presenting the locations of each of the plurality of virtual vehicles during the transportation simulation; and displaying statistics of a transportation service provided to the virtual passengers.

25. A non-transitory computer program product comprising instructions which, when the program is executed cause the program to: receive a first input of a geographical area; access map information of roadways in the geographical area; receive a second input indicative of at least one scenario of ridesharing demand in the geographical area; receive a third input indicative of a plurality of virtual vehicles designated to transport virtual passengers associated with the at least one scenario of ridesharing demand in the geographical area; initiate a transportation simulation of the at least one scenario of ridesharing demand in the geographic area to simulate rides of the plurality of virtual vehicles transporting the virtual passengers along the roadways; determine, based on the transportation simulation, a performance level associated with the plurality of virtual vehicles; and provide an output representative of the determined performance level associated with the plurality of virtual vehicles and a recommendation for improving the performance level by changing a number of the plurality of virtual vehicles designated to transport the virtual passengers.

* * * * *